June 1, 1937.  S. N. WIGHT  2,082,435
METHOD AND MEANS FOR DISPATCHING TRAINS
Filed Aug. 6, 1925   9 Sheets-Sheet 1
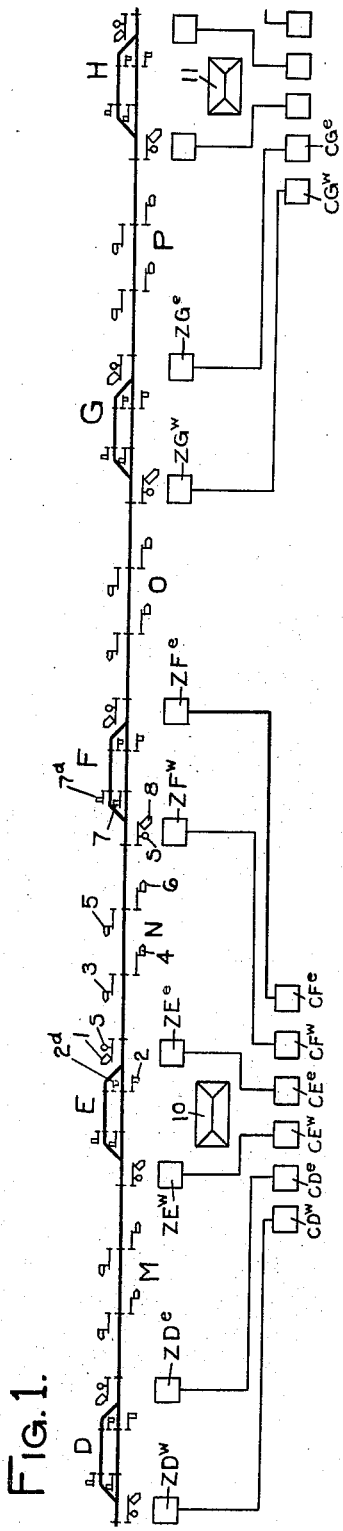
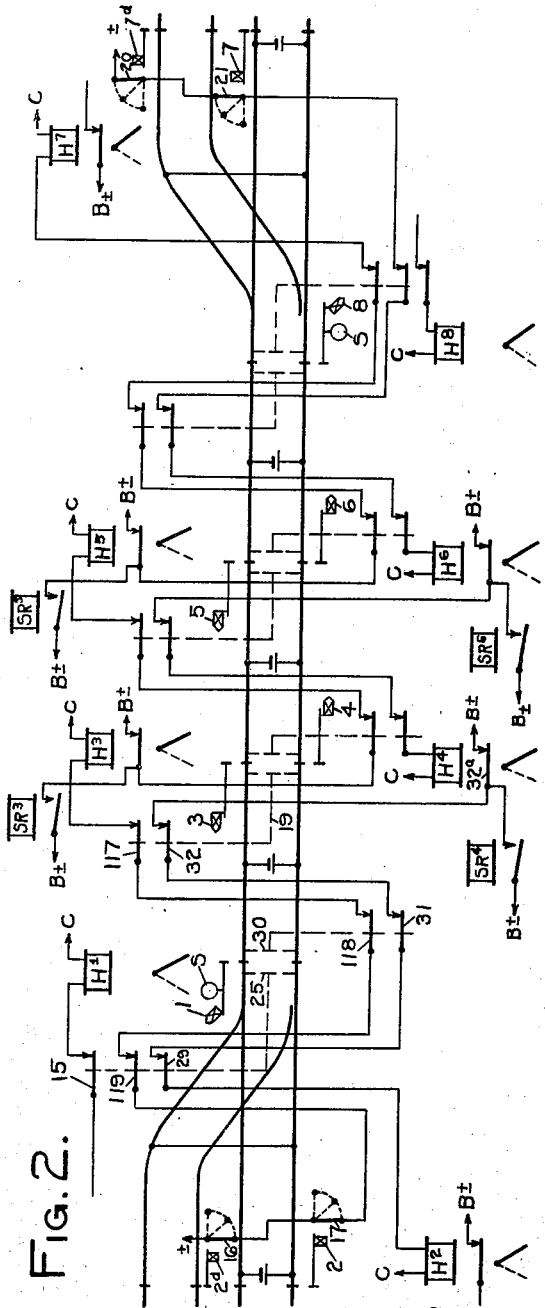

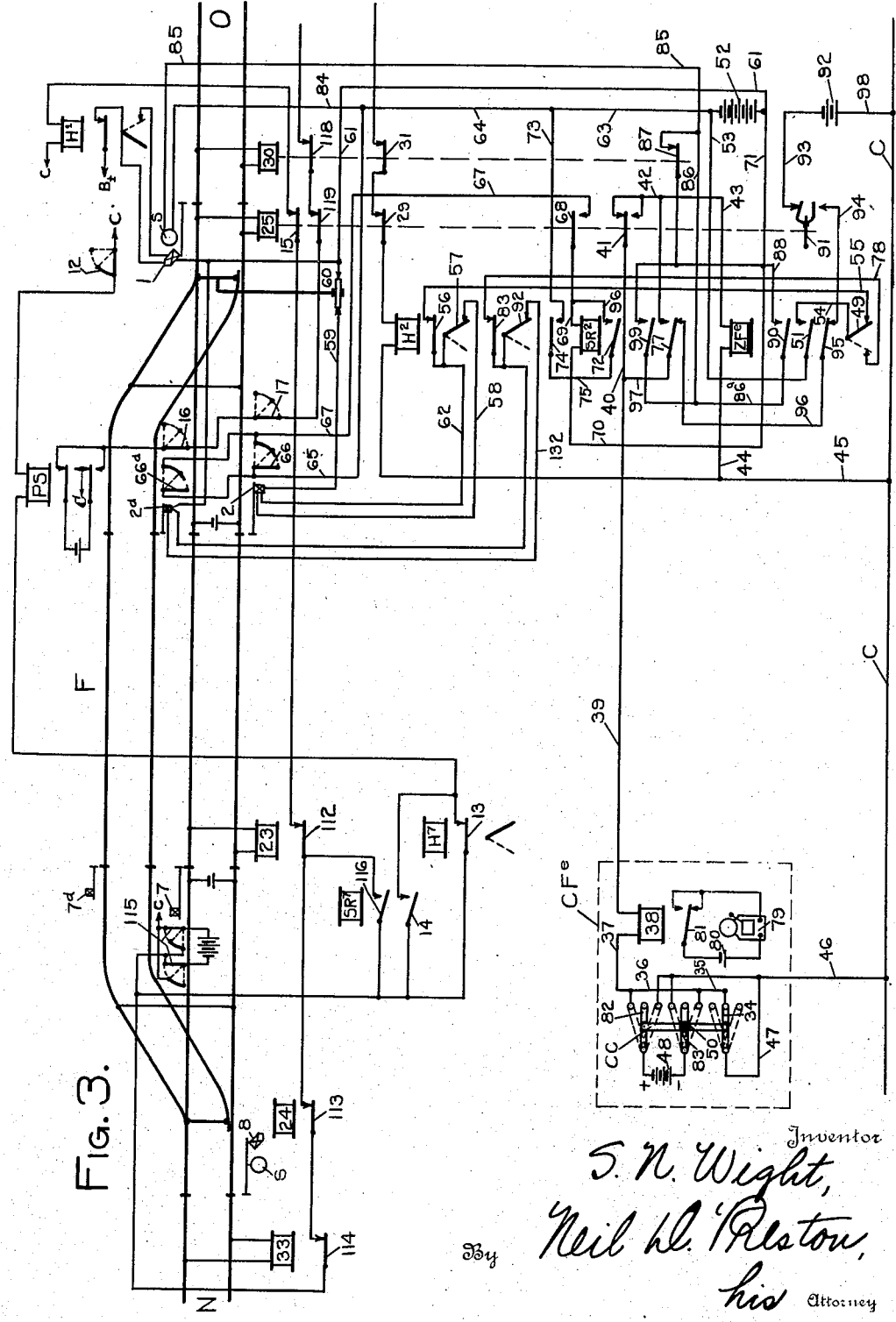

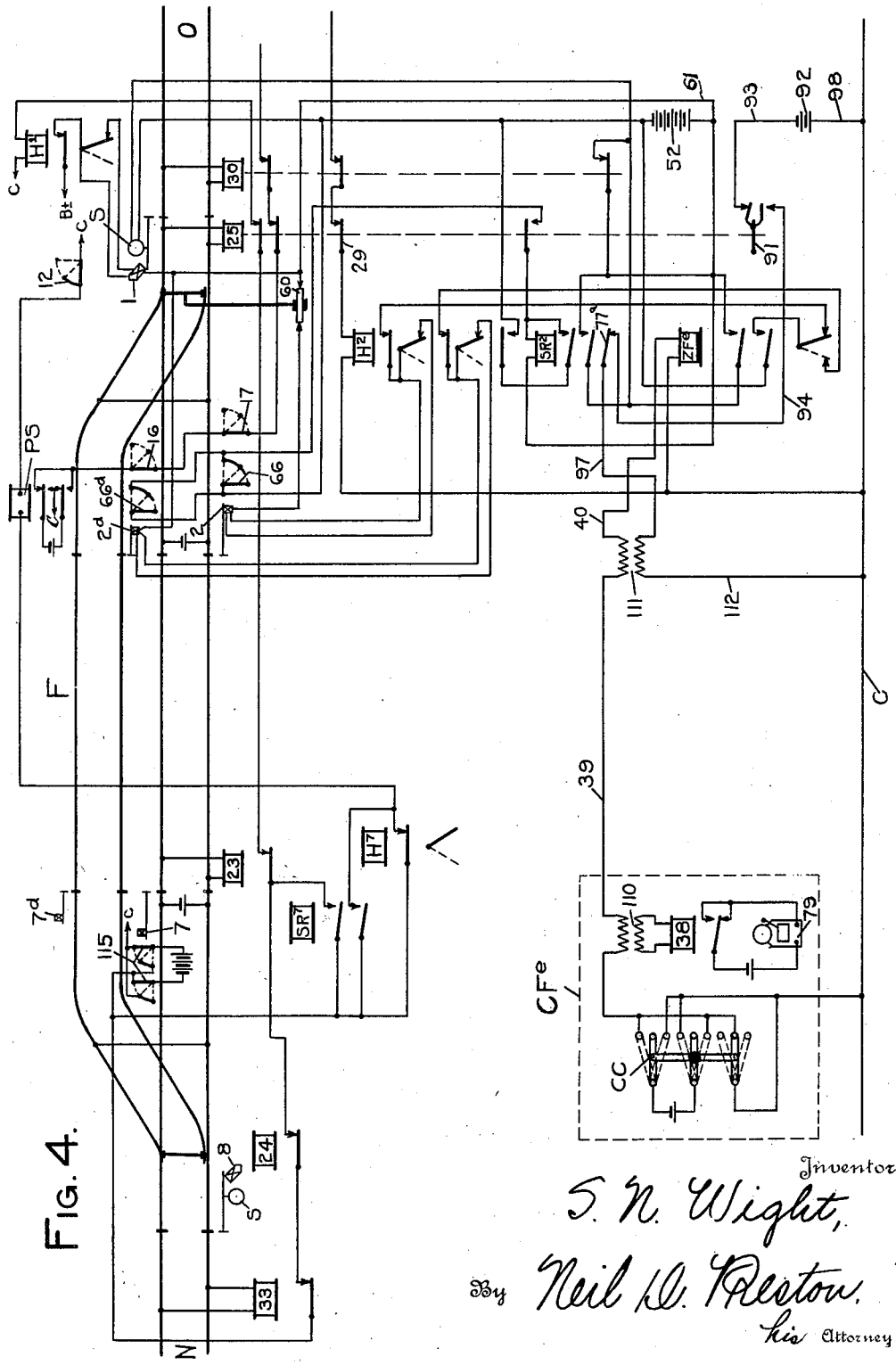

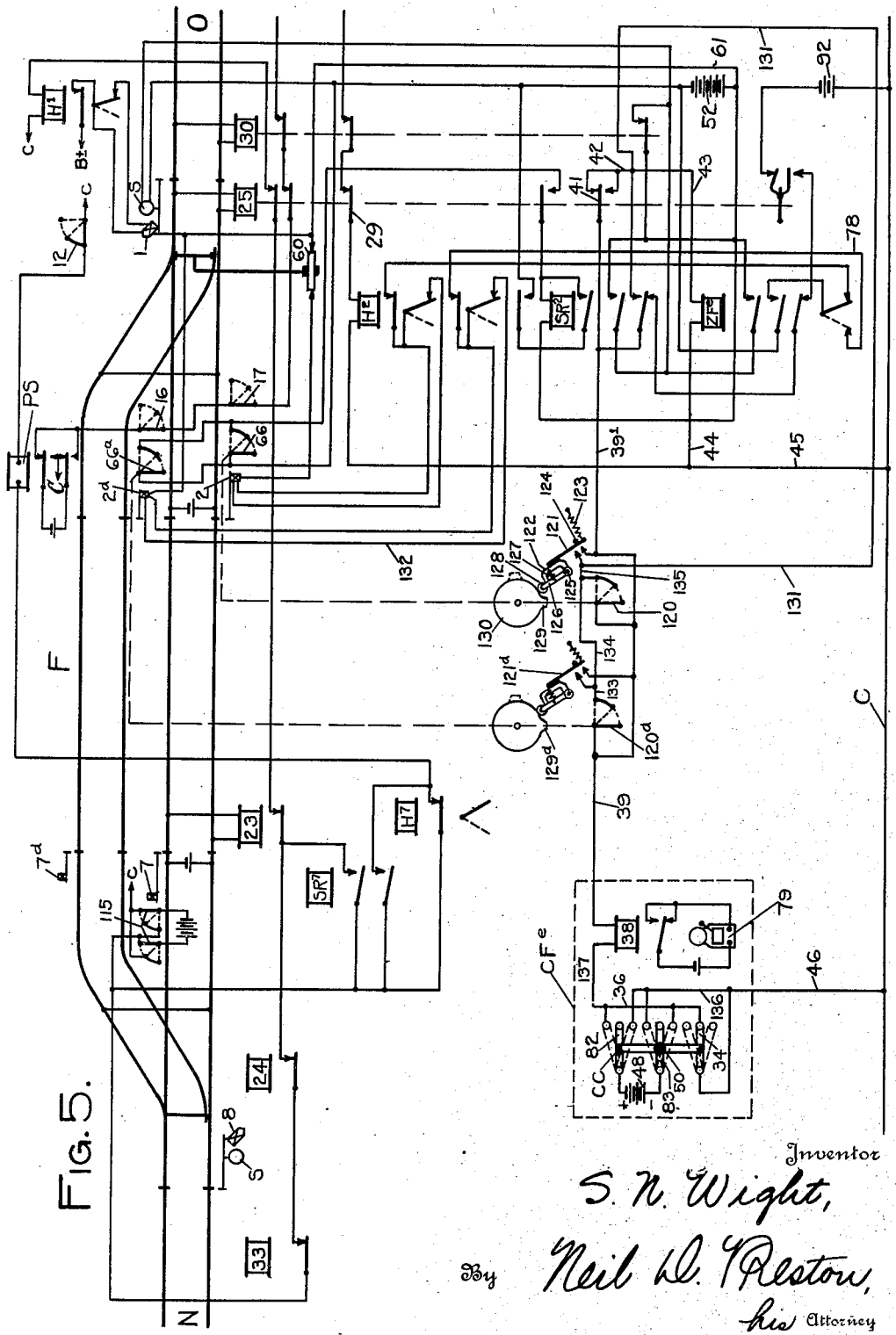

June 1, 1937. S. N. WIGHT 2,082,435
METHOD AND MEANS FOR DISPATCHING TRAINS
Filed Aug. 6, 1925 9 Sheets-Sheet 5
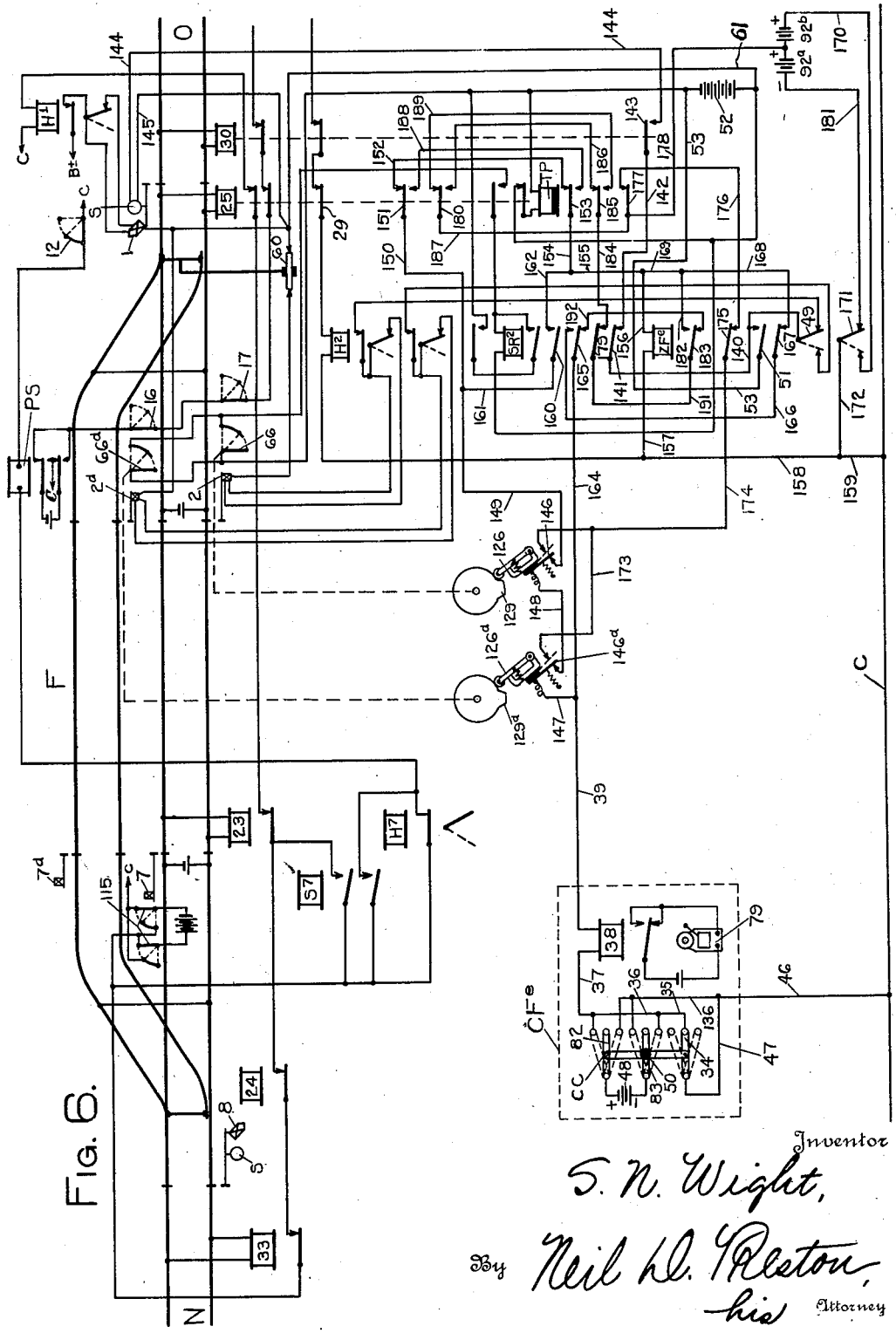

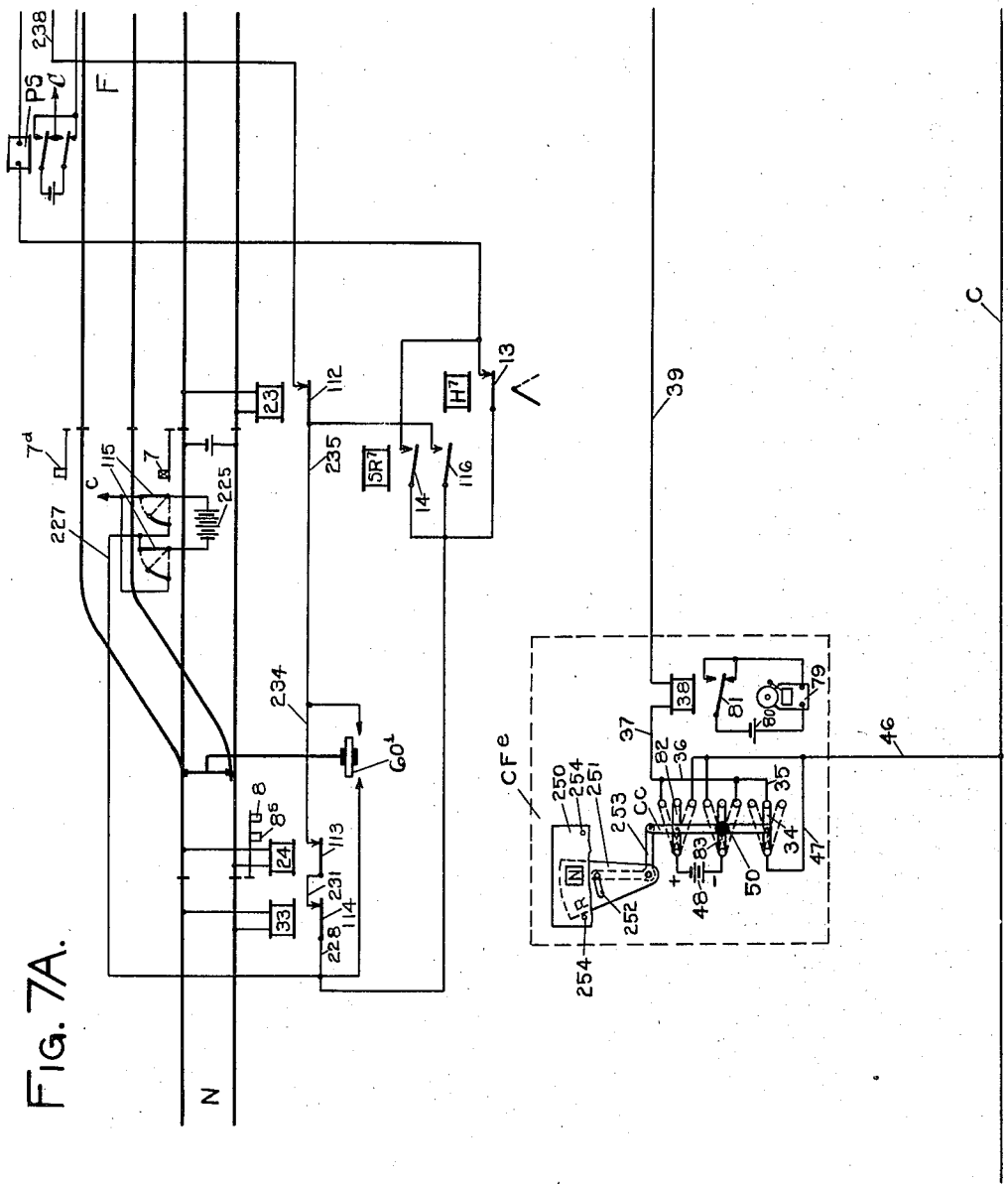

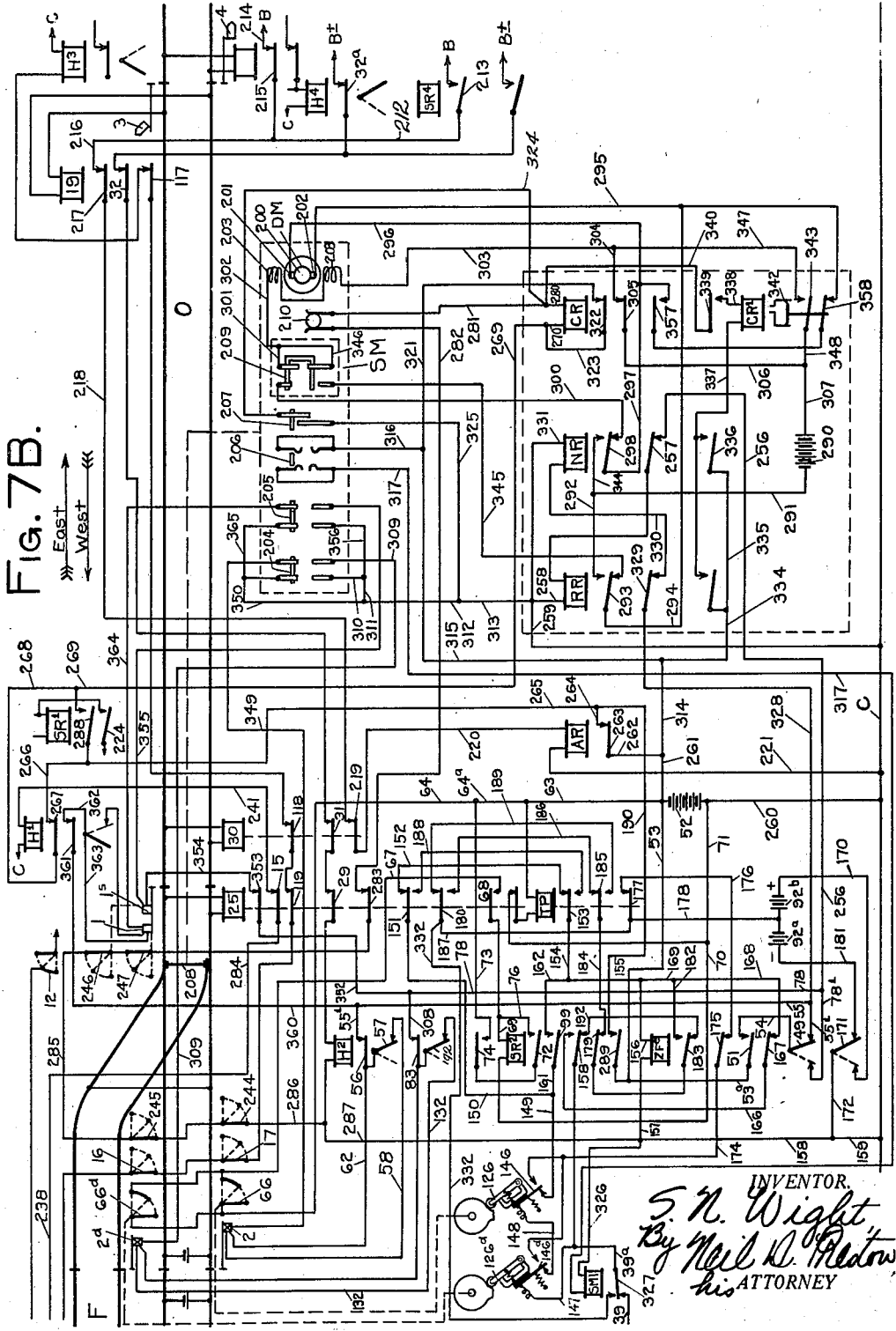

June 1, 1937. S. N. WIGHT 2,082,435
METHOD AND MEANS FOR DISPATCHING TRAINS
Filed Aug. 6, 1925 9 Sheets-Sheet 8
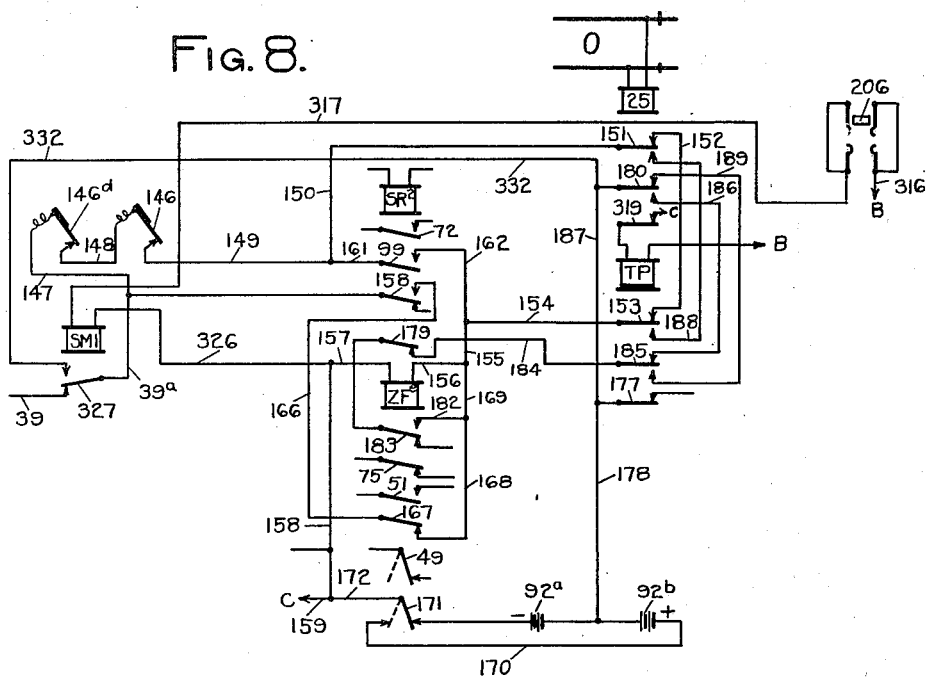
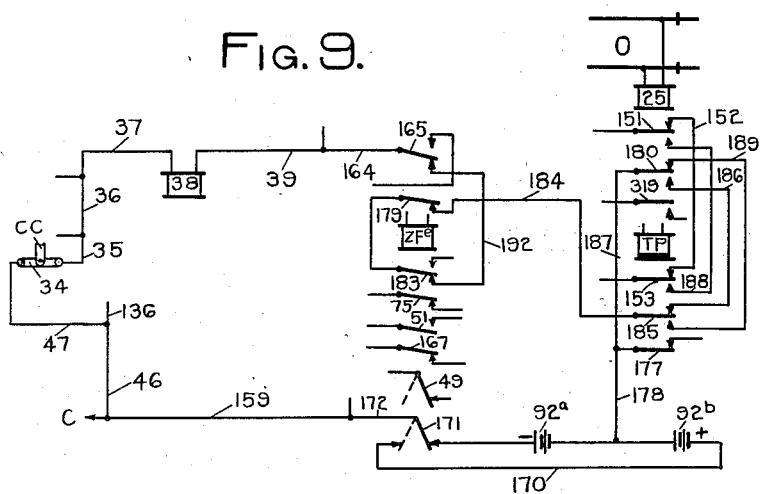
Inventor
S. N. Wight,
By Neil A. Alston,
his Attorney June 1, 1937.  S. N. WIGHT  2,082,435
METHOD AND MEANS FOR DISPATCHING TRAINS
Filed Aug. 6, 1925  9 Sheets-Sheet 9

Inventor
S. N. Wight,
By Neil H. Preston,
his Attorney

Patented June 1, 1937

2,082,435

UNITED STATES PATENT OFFICE 2,082,435

METHOD AND MEANS FOR DISPATCHING TRAINS

Sedgwick N. Wight, Rochester, N. Y., assignor to General Railway Signal Company, Rochester, N. Y.

Application August 6, 1925, Serial No. 48,553

106 Claims. (Cl. 246—3)

This invention relates to a method of operation or system for regulating or controlling train movements on railroads, and more particularly to combined automatic and manual control of signal indications, together with operation of switches, whereby trains may be operated almost entirely by signal indications and without train orders.

Modern automatic block signal systems assure safety of train movement, both on single track and on double track railroads, especially if a suitable system of automatic train control is employed to compel obedience to the signal indications in the cab or on the trackway; but for the efficient and expeditious movement of trains under the widely varying conditions occurring in practice at different times on the same portion of the railroad, it is necessary to maintain some centralized supervision over the trains in addition to that afforded by the block signal system, and also by rules of superiority of trains and time card rights, as is well known and recognized in the art. This additional supervision is commonly provided under the present practice by train orders issued by a dispatcher handling the trains on a selected portion of the railroad. For well known reasons, unnecessary to discuss in detail, the use of train orders involves various expense, as for example maintenance of local operators for the sole purpose of handling train orders and occasions delay in train movement, which would be avoided, to a large degree at least, if the same instructions or information afforded by the train orders could be communicated to the engineers of trains by signal indications under the control of a dispatcher or block operator having a relatively large portion of the railroad under his supervision.

With these well recognized principles of consideration in mind, according to the present invention, and briefly stated, it is proposed to organize a combined manual and automatic control in such a way that a dispatcher or block operator may control train movements over an extensive portion of the track by signal indications, also operating, if desired, the switches at sidings, cross-overs, and the like. The various principles and specific means for practicing this method of handling train movements are adaptable in various ways to the differing conditions encountered in practice; and to illustrate and explain the nature of the invention, I have shown and described only one typical arrangement or organization for single track railroads, with some illustrative modifications of parts of the apparatus. Various specific objects of the invention, functions, advantages, and characteristics will in part be apparent as the description of the selected embodiments progresses, and will in part be pointed out; and in considering the following description and explanation, it should be borne in mind that the various means and operations specifically described are of generic application and adaptable to other conditions occurring in railroad operation.

In describing the selected embodiments of the invention in detail, reference will be made to the accompanying drawings in which:

Fig. 1 shows in a simplified and diagrammatic manner a portion of a single track railroad organized and equipped in accordance with one form of the invention;

Fig. 2 illustrates more in detail a portion of the track shown in Fig. 1, between two passing sidings, and some of the control circuits for the signals;

Fig. 3 illustrates in detail the control and indication apparatus for the signals at the exit end of one of the passing sidings F of the track arrangement of Fig. 1;

Figs. 4, 5 and 6 illustrate modified forms of the control and indication apparatus like that shown in Fig. 3;

Figure 10:
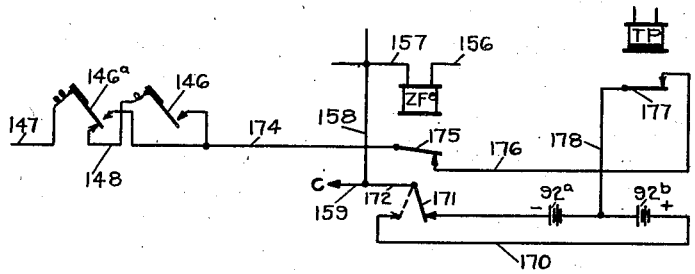

Figs. 7A and 7B taken together, illustrate in detail the control circuits and apparatus for the signals and switch operating mechanism at the exit end of one of the sidings F in Fig. 1, these two Figs. 7A and 7B illustrating a portion or unit of the complete embodiment of the invention; and Figs. 8, 9, 10 and 11 show the control circuits for various individual devices or equipment illustrated in Figs. 7A and 7B, these circuits being segregated in this way to facilitate explanation and understanding of the wiring connections and operation.

While, as already pointed out, the principles and specific apparatus of this invention are adaptable to various arrangements of track on both single and double track railroads, for simplicity and convenience of description and explanation, I have assumed that my invention will be applied to a portion of a single track railroad having a relatively simple and typical arrangement of passing sidings, such as diagrammatically shown in Fig. 1. In this case, referring to Fig. 1, the portion of single track railroad is separated in the usual way into stretches or portions of single track M, N, O and P between passing sidings or meeting points D, E, F, G and H. The movement of trains over the stretches of single track, and into and out of the passing sidings, is handled by trackway signals, both automatically operated by the trains themselves, and also manually by dispatchers or operators located at selected intervals. In the specific case, shown, it is assumed that a block operator will have supervision or control over three passing sidings and the two intervening stretches of single track, although it is obvious that this zone of control may be extended as far as desired. In Fig. 1 are shown towers 10 and 11 at which the block operators are located to handle train movements over the portion of track shown, together with an additional stretch of single track and a passing siding to the right of the siding H, but not shown. At each end of each passing siding is a like unit of control apparatus and circuits, which is connected by one line circuit, a single line wire and a common, connected to a control and indicating equipment in the tower of the block operator having control over the corresponding siding. As diagrammatically shown in Fig. 1, the control and the indication equipment at each end of the passing sidings are illustrated by squares designated $ZD^w$, $ZD^e$, (siding D west and east ends) $ZE^w$ and $ZE^e$ etc; and the control and indication units at the towers are similarly shown by squares designated $CD^w$, $CD^e$, $CE^w$ and $CE^e$ etc. The particular devices and control circuits in these equipments will be hereinafter explained in detail.

It is assumed, that an automatic block signal system for single track railroads of the well known type, commonly known as absolute-permissive-block system, or an A. P. B. system, will be used; and the devices and circuits necessary to carry out this invention have been shown in the form adaptable for use with such an A. P. B. system, and also the slight modifications in the A. P. B. system necessary or preferable to practice this invention. Accordingly, wayside signals are shown conventionally in Fig. 1 and are arranged in accordance with an A. P. B. system, semaphore signals being assumed although of course any other suitable type of signal, such as the color light, or position light signal may be used. The arrangement of signals is assumed to be the same at each siding and for each stretch of single track between the sidings; and referring to the sidings E and F and the stretch of single track N, there is a starting or absolute stop-and-stay signal 2 at the siding E governing train movement from the main track on to the stretch of single track N, and a corresponding or like starting signal 7 at the siding F. On the siding E is a signal $2^d$, ordinarily taking the form of a dwarf signal but which must be obeyed the same as a starting signal, which controls train movement from the siding onto the stretch of single track N; and a similar dwarf signal $7^d$ is provided for the other siding F. The stretch of single track N is provided with intermediate signals in accordance with common practice. In this case, opposite intermediate signals as distinguished from staggered intermediate signals are assumed to be employed, and the signals 4 and 6 govern traffic from left to right, conveniently designated east bound traffic, while the signals 3 and 5 govern west bound traffic. Adjacent to the siding E and governing traffic from the stretch of single track in toward the siding, is an automatic signal 1 and a take-siding signal S; and a similar signal 8 and a take-siding signal are provided for the siding F.

At this point in the discussion it appears to be expedient to explain the differences between the signal arrangement shown in Fig. 1 and that used in the well-known and typical A. P. B. system. The entering or starting signals 2 and 7, for reasons hereinafter explained, are located approximately opposite the fouling points for the corresponding switches of the sidings rather than at or in advance of the points of the switches; the dwarf signals $2^d$ and $7^d$, and the take-siding signals S are added; and the starting signals 2 and 7, and the starting dwarf signals $2^d$ and $7^d$, in addition to their automatic control, are subject to manual control by the block operator in the tower 10 and under conditions which may be termed to be normal, are in the stop position, as shown, so that the signals 1 and 8 are in the caution position. This specific arrangement of signals, and the normal position of the signals, is somewhat different, as hereinafter described in the complete embodiment of the invention shown in Figs. 7A and 7B, in which the switches of the passing sidings are operated by the block operator.

A. P. B. system

Since the particular embodiment of the invention shown is predicated upon the use of a typical A. P. B. system, and since several of the features of signal operation and control devices characteristic of the A. P. B. system are utilized in carrying out the principles of the invention, it is convenient to consider first the signal operations and control in an A. P. B. system. A typical A. P. B. system in its complete form is shown and described in detail in my prior Patent No. 1,294,736, dated February 18, 1919; and it will be sufficient to summarize briefly the features of this system of particular interest and significance in connection with the present invention. Referring to Figs. 1 and 2, a stretch of main track is divided into track sections, as shown conventionally, each having a track relay, there being ordinarily two track sections between each signal governing traffic in one direction and the next adjacent opposing signal governing traffic in the opposite direction. In Fig. 2, these track relays are shown conventionally as dash lines connected to the track rails. At each end of each siding is a track circuit, bonded to the rails of the siding at the fouling point, in accordance with well known practice. Each of the signals is controlled by a line relay, in the case illustrated the relay is of the neutral-polar or polarized type, to provide for the usual three indications. Each starting signal, as 2, and its corresponding dwarf starting signal as $2^d$ is controlled by one line relay, and also manually by the block operator, in the manner to be hereinafter explained. The control circuits for these two line relays are shown diagrammatically in part in Fig. 2; and briefly stated, it will be observed that the line or home relay of each signal includes front contacts of all of the track relays between it and the next signal in advance governing traffic in the same direction, and also with the exception of the signals 1, 3, 6 and 8, includes a front contact of a neutral armature of the line relay of the signal next in advance governing traffic in the same direction, in multiple with the front contact of the stick relay associated with said signal next in advance. More specifically, the line or home relay $H^2$ of the signals 2 and $2^d$ is normally energized by a circuit including contacts 29, 31 and 32 of the track relays 25, 30 and 19 and a neutral contact 32ᵃ of the polarized home relay H⁴. The stick relay just mentioned is controlled, as fully explained in my prior patent above mentioned, and also as hereinafter pointed out in some typical instances, so that it is energized by a train passing the corresponding signal in the direction of traffic governed thereby but not by a train moving in the opposite direction, and is maintained energized so long as its line or home relay is de-energized, or so long as the signal in question remains at stop.

On account of this method of control of the line relays of the signals, when an east bound train passes beyond the starting signal 2, or the dwarf signal 2ᵈ, all of the opposing signals governing west bound traffic, namely signals 1, 3, 5, 7 and 7ᵈ are automatically caused to assume or remain in the stop position blocking opposing train movement, until successively passed by the east bound train in question. As this east bound train advances, the signals governing traffic in the same direction, namely signals 2, 4, 6 and 8, automatically assume in succession their stop, caution and clear positions, the same as in double track signaling. Thus, a train entering the stretch of single track between two passing sidings, from either end, blocks all opposing moves, but permits other trains to follow it under the protection of signal indications the same as in double track signaling.

In addition to the signal operations just described, it is expedient to discuss the control of the two signals adjacent to a passing siding and governing traffic toward it, such as the signals 1, and 3, and 6 and 8. The control circuit for the line relay H¹ governing signal 1 is shown in part in Fig. 2, and more completely in Fig. 3. It will be observed that this control circuit includes the front contact 15 of the track relay 25 of the following track circuit, the contacts 112 and 113 of the two track relays 23 and 24 of the track sections between signals 8 and 2 of meeting point F, the contact 114 of the track relay 33 of the track section beyond and in the rear of the signal 8 at the west end of siding F, and that the polarity of the current flowing in the circuit depends on the position of the pole-changer contacts 115 operated by the signal 7. Also, if the stick relay SR⁷, associated with the signal 7 in Fig. 3 is energized by a west bound train movement the control circuit of the line relay H¹ is dependent only upon the track circuits between that signal 1 and the starting signal 7 of the same siding F. By virtue of this control, signal 1 is caused to assume a stop position when an opposing east bound train enters the first track circuit in the rear of the opposing permissive signal 8, but assumes its stop position for west bound moves only so long as there is a train between it and the next signal 7 governing westbound traffic. Putting it another way, the signal 1 has an overlap beyond the next west bound signal 7 of the same siding for opposing train movements, and this overlap is automatically eliminated for following train movements. The signal 8 has the same control as signal 1; and this control for signals 1 and 8 provides an overlap for these signals for trains moving toward each other, this control and operation being characteristic of the A. P. B. system and being fully explained in my prior patent above mentioned, does not require further detailed explanation.

Referring now to the control for the signal 3, the line circuit for its governing home relay H³, shown in part in Fig. 2 and more in detail in Fig. 3, includes front contacts 117 and 118 of the track relays 19 and 30 of the track sections between said signal 3 and the signal 1, the contact 119 of the relay 25 of the fouling track section, two circuit controllers 16 and 17 in series operated by the starting signal 2 and the dwarf signal 2ᵈ, these circuit controllers being closed at the stop position only, and pole changing contacts of a relay PS (see Fig. 3). The energizing circuit for the relay PS includes a circuit controller 12 operated by the signal 1, open if the signal 1 is in the stop position, but closed in the clear or caution position, and a front contact 13 of the line relay H⁷ of the signal 7 shunted by a front contact 14 of the stick relay SR7 of the same signal. Thus the line relay H³ of the signal 3 is de-energized if there is a train traveling in either direction on any one of the track sections between the signals 3 and 2, or if either the signal 2 or the dwarf signal 2ᵈ is in the caution or clear position. Also, the line relay H³ is energized with reverse polarity, causing its signal 3 to assume the caution position, if the signal 1 next in advance is in the stop position, or if an opposing east bound train has entered the stretch of single track N and has de-energized the line relay H⁷ (see Fig. 3). In short, referring to Fig. 1, an east bound train entering the stretch of single track M not only brings to stop the west bound starting signals 7 and 7ᵈ, the signal 1 next in the rear that is toward the east thereof to caution, but also brings the next signal 3 to the caution position, giving what is commonly known the double caution indication. For west bound train movements, however, the caution indication of the signal 3 is dependent upon the signal 1 next in advance being in the stop position. The control for the line relay H³ of the signal 3 just described, is the same as in the typical A. P. B. system described in my prior patent above mentioned, with the exception that the circuit controllers 16 and 17 on the starting signal 2 and the dwarf signal 2ᵈ, and the circuit controllers 21 and 20 on the starting signal 7 and dwarf signal 7ᵈ are included in the energizing circuit for the home relays H³ and H⁶ respectively; and while these circuit controllers may be omitted they and the control afforded thereby constitute one of the important features of the modification of the typical A. P. B. system characteristic of the present invention.

These circuit controllers 16, 17, 21 and 20, just described, provide a form of interlock between the signals governing traffic in the opposite direction over a stretch of single track, so that the block operator, who may manually cause the main starting signal 2 or the dwarf starting signal 2ᵈ to assume or remain in the stop position, independent of automatic control by trains, may at will select, so to speak, the direction of train movement for the stretch of single track. Since the home or line relay H³, if de-energized, de-energizes the line relay H⁵ of the signal next in the rear, which in turn de-energizes the line relay H⁷, it can be readily seen that, with either the main starting signal 2 or the dwarf starting signal 2ᵈ in the clear or caution position, as is the case when an east bound train movement is contemplated, and either the circuit controller 17 or 16 is open, not only is the signal 3 held in the stop position, but also signals 5, 7 and 7ᵈ, blocking west bound train movement in the opposite direction, are held at stop. The advantages resulting from such control, and incident to the use of the circuit controllers 16, 17, 20 and 21 will appear as the description progresses.

Manual control

Briefly stated, the block operator in tower 10 has manual control, so far as giving the stop indication is concerned, independent of the automatic control afforded by the track relays and train movement, over the starting signals, both main and dwarf at the ends of the sidings under his supervision. The block operator cannot, however, clear any of these starting signals or dwarf signals independent of the automatic control by the trains. In other words, the block operator may hold the starting signals or dwarf signals at stop although there are no trains present to necessitate such stop indications, but cannot clear these signals unless traffic conditions permit. Also, the block operator can select between the main and the dwarf starting signal at the same end of the siding and allow one or the other to clear. This control, as about to be explained, is obtained over one polarized line circuit, including a line wire and the common return wire of the system.

The block operator also is able to control, over the same control line circuit, the indications of the take-siding signals S, displaying or obscuring at will a take-siding indication.

It will be evident that the block operator needs accurate and complete information with respect to the location of trains and their movement, in order to be able to determine when to exercise his manual control over the starting signals, dwarf signals and take-siding signals. This information, according to the embodiment of the invention shown and described is communicated to the block operator over the same line circuit by intermittently, opening and closing this circuit at the siding as conditions require as trains travel through.

Assuming a combined manual and automatic control such as indicated, and also the communication of information respecting train movement, it can be readily seen that the block operators may cooperate under the supervision of a main dispatcher to handle all of the ordinary train movements by signal indication only, and without issuing train orders. A few typical examples of train movements which can be expeditiously handled in this way will serve to illustrate the flexibility and capability of the system of this invention. For example, referring to Fig. 1, an ordinary passing meet of two opposing trains within the zone or territory of one block operator can be very easily handled. Suppose an east bound and west bound train are to pass each other at the siding E. The block operator determines which train shall take the siding and displays the corresponding take-siding signal. By reason of his control over the starting signals, he can hold either train which happens to arrive at the siding first until the other train has passed. The same is true for passing meets of opposing trains at the sidings F and G, although in this instance the block operators in the towers 10 and 11, who are of course in telephone or telegraph communication, must cooperate to avoid delay. Similarly, a superior train following an inferior train may be passed around at any selected passing siding by signal indication and without orders. For example, suppose two east bound trains are to pass at the siding E. The block operator at the tower 10 determines whether the leading train should take the siding or the main track and sets the take-siding signal accordingly, also holding the starting signal 2 or the dwarf signal 2$^d$ in the stop position to hold the leading train. After the leading train has acted on these signal indications, the block operator may cancel the take-siding indication; and if the leading train is in the clear, and also there are no conflicting opposing or other moves can clear up the signals for the following train. It is believed to be unnecessary to explain the manipulation of the system to take care of all of the common train movements, since it can be readily understood that, with the necessary information, and with adequate manual control of the signals provided, the block operator may cause different trains under any condition to stop, take siding and proceed, as desired. Trains, such as work trains, which have regular movements, can be guided to a degree by the signal indications according to the system of this invention, but ordinarily the movements of work trains are most conveniently handled by train orders as well as the manual and automatic control of the signal indications.

The devices and circuits providing for the manual control and communication of information of train movements are shown diagrammatically in one form in Fig. 3.

Manual control of signals (Fig. 3)

It has been mentioned heretofore that in accordance with the present invention the block operators may through the medium of a single circuit and suitable control mechanism control the signals at one end of a passing siding, and may also receive over this same control circuit signal information as to the movement of trains commonly known as "O. S. signaling". Although a large number of control and indicating units of this kind have been conventionally shown in Fig. 1 since these various units are the same, it is considered necessary to describe only one of them, and for this reason the control wire for the particular unit herein described (unit CF$^e$—ZF$^e$) has been shown in heavy lines in Fig. 1.

Referring now to Fig. 3 which shows the control and indicating mechanism connecting the block operator in tower 10 with the signals and associated mechanism at the east of passing siding F, the mechanism CF$^e$ in tower 10 includes a battery 48, a circuit controller CC having contact blades 34, 83 and 82, and an operating handle or button 50, an alarm relay 38 and a bell 79. Under conditions, which have been assumed to be normal, the circuit controller CC is in its intermediate position, as shown, and completes a circuit through the relay 38, and the relay ZF$^e$ comprising the main control relay at the east entrance to the passing siding F. This circuit may be traced as follows:—beginning at the blade 34 of circuit controller CC, wires 35, 36 and 37, alarm relay 38, wires 39 and 40, contact 41 of the track relay 25, wires 42 and 43, winding of the relay ZF$^e$, wires 44 and 45, common return wire C, wires 46 and 47 back to the blade 34. Since there is no source of energy in this circuit the relay ZF$^e$ assumes its de-energized position.

It readily appears that if the circuit controller CC is moved to its upper position the relay ZF$^e$ will be energized positively, in which event its polar contact assumes the right hand position as shown, and that if the controller CC is moved to its lower position this relay ZF$^e$ is energized negatively and the polar contact assumes the dotted position, so that the block operator has complete control over the relay ZF$^e$. When this relay ZF$^e$ is energized positively the starting signal 2 will assume a position depending upon the energized condition of the home relay H$^2$. If, therefore, the home relay H$^2$ is in its normal positively energized position the starting signal 2 assumes the clear position by reason of the completion of the following circuit:—beginning at the battery 52, wire 53, front contact 51 of the relay ZF$^e$, wire 54, polar contact 49, wire 55, neutral contact 56 of the home relay H$^2$, polar contact 57 of this same relay, clear wire 58 through the signal mechanism of signal 2 through wire 59, switch box contact 60, closed only when the siding switch is set for the main track, wire 61 back to battery 52. If the home relay H$^2$ assumes the reverse position this signal 2 assumes the caution position through the same control circuit just traced except that it includes the caution wire 62 instead of the clear wire 58. In the same way, the three-position dwarf signal 2$^d$ assumes a position depending on the energizing condition of the home relay H$^2$ if the control relay ZF$^e$ is energized negatively. The circuits for the dwarf signal 2$^d$ are in every way symmetrical to those of the signal 2 but include wires 78 and 132 instead of wires 55 and 58 and include contacts 83 and 92 instead of contacts 56 and 57, so that it is unnecessary to trace these circuits specifically. It should be noted that the common return wire for the dwarf signal 2$^d$ does not include the switch contact 60, it being obvious that the dwarf signal 2$^d$ should be permitted to assume the clear position when the siding switch is set for the siding.

Let us now consider how the block operator may control the take-siding signal S so as to either display or obscure a take-siding indication. In the particular embodiment of the invention shown in Fig. 3 the take-siding signal S is one of the type which if energized will cause the take-siding indication to be obscured so that if the block operator wishes to have a west bound train moving in the stretch of single track O take the main track he must energize the control relay ZF$^e$ so as to obscure the take-siding indication. The circuit whereby this may be accomplished may be traced as follows:—beginning at the battery 52, wires 63, 64 and 84, mechanism of the take-siding signal S, wires 85, 86 and 86$^a$, front contact 90 of the relay ZF$^e$, wires 88 and 71 to the other side of battery 52. It should be noted, that this contact 90 of the relay ZF$^e$ is shunted by the front contact 87 of the track relay 30 and the front contact 99 of the stick relay SR$^2$. These contacts 87 and 99 are provided so that the take-siding signal S can only be displayed when there is a train occupying the section including track relay 30 and providing such train is approaching the siding, for if the train is receding from the siding the stick relay SR$^2$ will be up for reasons hereinafter given and the take-siding signal will not be displayed.

*Train movement information or O. S. signaling*

Let us now briefly consider how the block operator in tower 10 may be informed as to the movement of trains into and out of a siding or main track adjacent thereto, and in order to do so let us assume that the apparatus shown in Fig. 3 is in the condition in which it is shown and that there is a train moving from right to left in the stretch of single track O, which train will of course take the siding because the relay ZF$^e$ is not energized and the take-siding signal is not obscured. As soon as this train reaches the track section containing track relay 30 the contact 87 of this relay assumes its retracted position thereby opening the circuit for the signal mechanism of take-siding signal S and causing it to be displayed, thus informing the engineer that he must throw the hand switch at the siding and proceed into the siding. As the train enters the fouling section the track relay 25 assumes its de-energized position and during the dropping of the armature of this relay the following circuit including the alarm relay 38, is momentarily completed through the make-before-break contact 91 of this relay 25:—beginning at the battery 92, wire 93, make-before-break contact 91, wire 94, back contact 95 of the control relay ZF$^e$, wire 96, back contact 77 of the stick relay SR$^2$, wires 97 and 39, alarm relay 38, wires 37, 36 and 35, contact 34 of the circuit controller CC, wires 47 and 46, common return wire C and wire 98 back to the other side of battery 92. With this circuit momentarily completed the alarm relay is momentarily energized and thereby causes the single stroke bell 79 connected in a circuit including battery 80 and a contact 81 of the relay 38, which circuit is closed when the relay is energized or when it is de-energized but not while changing from its energized to its deenergized position or vice versa. With this relay 38 momentarily energized the single stroke bell 79 will sound two closely spaced taps, one when it is energized through the front contact and the other when it is energized the second time through the back contact. These two closely spaced taps on bell 79 informs the block operator that the train in question has entered the fouling track circuit and further tells him, because the take-siding signal is displayed, that this train has entered the siding. As the rear end of the train finally moves off of this fouling track circuit the track circuit again picks up thereby again causing the bell to sound two closely spaced taps informing the operator that the train has passed entirely into the siding F.

Let us now consider an east bound train standing on the main track adjacent siding F and let us assume that this train is to proceed into the stretch of single track O because the operator at tower 10 has cleared the signal 2 by energizing the control relay ZF$^e$ positively, and let us particularly note the O. S. signal information given during the progress of this train when moving into the stretch of single track. As the train enters the fouling track circuit containing track relay 25, this track relay 25 assumes its de-energized position and in so doing completes a pick-up circuit for the usual stick relay SR$^2$ which may be traced as follows:—beginning at the battery 52, wires 63, 64 and 65, contact 66 of the signal 2 which has not yet reached its danger position, wire 67, back contact 68 of the track relay 25, wire 69, winding of the stick relay SR$^2$, wires 70 and 71 back to the other winding of battery 52. Dropping of this track relay 25 also de-energizes the home relay H$^2$ thereby dropping contact 74 and completing a stick circuit for the relay SR$^2$ which may be traced as follows:—beginning at battery 52, wires 63 and 73, back contact 74 of the home relay H$^2$, wire 75, stick contact 72 of the stick relay SR$^2$, wires 96 and 69, winding of the stick relay SR$^2$, wires 70 and 71 back to the other side of battery 52. Also, the dropping of the track relay 25 momentarily interrupts the energizing circuit for the relays ZF$^e$ and the relay 38 connected in series therewith so that two closely spaced taps are given by the bell 79, this momentary interruption of the circuit being due to dropping of the contact 41 of the track relay 25. It is desired to be pointed out, that the relay ZF$^e$ is slow acting, as conventionally shown, and does not respond to this momentary interruption of the circuit. As the train passes entirely off of the fouling track circuit into the stretch of single track O no spaced taps of the bell are given because the stick relay SR$^2$ has in the meantime assumed its energized position and has through the medium of contact 77 shunted the contact 41 of the track relay 25.

In other words, when a train passes from right to left into either the main track or the siding two closely spaced taps on the bell 79 are given when the train enters and again when it leaves the fouling track circuit; whereas a train moving from left to right into the stretch of single track only sounds the bell by two closely spaced taps when the train enters such stretch of single track and not when its rear end passes off of the fouling track circuit, so that the signal information given for incoming trains is distinctive from that of outgoing trains. The O. S. signal information given when a train passes off of a siding into the stretch of single track is the same as that given when a train passes off of the main track into the stretch of single track, the operator of course knowing whether the train has passed off of the main track or the siding because he must have cleared only one of the two starting signals 2 or 2$^d$. It should also be noted that the stick relay SR$^2$ is picked up when a train passes off of the siding in the same way as when it passes off of the main track, this by reason of the contact 66$^d$ operated by the dwarf signal 2$^d$.

In view of the discussion heretofore given as to the contemplated operation of a system embodying the present invention, including suitable means for controlling the signals and for informing the block operator as to the presence of trains and the direction in which they are moving, no further detailed description of the operation of the system shown in Fig. 1 in which each of the control and indicating units comprise a mechanism such as shown in Fig. 3 is deemed necessary.

Modification (Fig. 4)

Instead of employing direct current over the single line wire 39 for doing both controlling the control relays ZF$^e$ and receiving O. S. signals, that is, signals giving information as to the movement of trains, it is proposed in accordance with the invention illustrated in Fig. 4 to employ direct current for controlling this relay ZF$^e$ and employing alternating current for sounding the bell 79. In the arrangement shown, in Fig. 4, this has been accomplished by making very slight changes in the wiring arrangement and without the provision of an alternating current source of energy. A transformer coupling between the line wire 39 and the alarm relay 38 has been added which includes a transformer 110 having its primary winding connected in series with the line wire 39 and having its secondary winding connected to the relay 38. Also, there has been provided a transformer 111 having its secondary winding connected in series with the line wire 39 at the end of the line remote from the operator which has its primary winding connected in a circuit which is momentarily completed upon change of the track relay 25 from its energized to its de-energized position, and vice versa. This circuit may be traced as follows:—beginning at the battery 92, wire 93, make-before-break contact 91, wire 94, back contact 77$^a$ of the stick relay SR$^2$, wire 97, primary winding of the transformer 111, and wire 112 connected to the common return wire C which through wire 98 is connected to the other side of the battery 92. It should be noted that in the arrangement shown in Fig. 4 the control relay ZF$^e$ is connected directly to the line wire 39 by wire 40 instead of being connected through contacts 77 and 41 in multiple as illustrated in Fig. 3.

The net result of the arrangement shown in Fig. 4 is that the bell 79 is sounded by alternating current derived by fluctuating direct current derived from battery 92, that is, by momentarily applying direct current to the primary winding of the transformer 111 through the circuit just traced. It will readily appear that the alarm relay 38 is energized by a momentary impulse of alternating current resulting from such momentary energization of the primary winding of the transformer 111 regardless of whether direct current energy is applied through line wire 39 to energize the control relay CF$^e$, or not; and for this reason the contact 41 operated by the track relay 25 is no longer necessary and has been omitted; that is, the make-before-break contact 91 is just as capable of causing the sounding of bell 79 when the line wire is energized by direct current as when it is not so energized, and therefore serves the same purpose as do contacts 41 and 91 together in the arrangement shown in Fig. 3. Obviously, the operation of the apparatus shown in Fig. 4 as far as the control of the relay ZF$^e$ is concerned, is the same as that disclosed in Fig. 3; in this connection it should be noted that the back contact 77$^a$ of the stick relay SR$^2$ permits an O. S. signal to be transmitted by a change in the position of track relay 25 only when the stick relay SR$^2$ is de-energized, the same as is true of the arrangement shown in Fig. 3. The net result is, when the stick relay SR$^2$ is energized no O. S. signal is given, so that if trains move into the siding a double tap signal is given when the train enters the fouling track circuit and when it leaves this track circuit, whereas if a train leaves a meeting point an O. S. signal consisting of two taps is only given when the train enters such fouling track circuit, the stick relay being up to avoid giving an O. S. signal when such train leaves this fouling track circuit.

Modification (Fig. 5)

The arrangement shown in Fig. 5 is the same as that shown in Fig. 3 as far as the operator's control over the starting signals 2 and 2$^d$ and the take siding signal S is concerned; and is very much the same as that shown in Fig. 3 with respect to the apparatus affording O. S. signaling, or indication of movement of trains, for trains moving into a siding, that is, one double tap of the bell 79 is given when such train enters upon the fouling section track circuit and another double tap is given when it leaves the fouling section; but the O. S. audible signal given during leaving of a train from a meeting point is somewhat different and more distinctive.

Briefly stated, in Fig. 5 movement of a train into a single track section effects first a momentary and then a prolonged interruption of the then energized circuit including line wire 39, the first interruption of which is effected by the track relay 25 and the second and prolonged interruption of which is effected by a contact operated by the semaphore blade of one or the other of the starting signals 2 and 2<sup>d</sup>.

In order to give two appreciably spaced taps on the bell 79, which of course is distinctive from two closely spaced taps on this bell and which distinction differentiates between approaching and leaving trains, certain additional apparatus is required. In addition to the semaphore operated contacts 17 and 66 operated by the semaphore blade of signal 2, this signal is provided with a double throw contact 120 and a contact 121, which latter contact is only operated when the signal changes from the danger to either the caution or the clear position. In practicing the present invention a snubbing contact of the usual construction, such as shown in the patent to Howe No. 1,092,266 may be employed to open or close a circuit as conditions require effective only when the semaphore blade is operated in one direction, and for convenience a contact functioning similarly has been shown conventionally. In the particular arrangement shown the contact 121 is fastened to but insulated from the contact carrier 122, and is biased by the spring 123 against the stationary stop 124. The contact carrier 122 is pivotally supported on a journal 125 on which journal is also pivotally supported the arm 125 urged by the spring 127 against the contact carrier 122. This arm 126 has a roller 128 pivotally secured in the bifurcated end thereof, which roller is engaged by the projecting cam 129 of the disc 130 operated by the semaphore signal blade.

By looking at the mechanism for operating this contact 121 it readily appears that when the circuit controller drum or disc 130 is rotated from the danger position, in which it is shown, to the dotted position this contact 121 is operated and bridges the stationary contacts indicated by arrows for a time; whereas if this disc 130 is rotated from the dotted clear position to the normal danger position the cam 129 merely operates the arm 126 separately from the contact supporting member 122, such free movement of the arm 126 being permitted by reason of the spring 127.

Similarly, the dwarf signal 2<sup>d</sup>, is provided with contacts 120<sup>d</sup> and 121<sup>d</sup> which are constructed and function the same as those shown in connection with the signal 2, just described. The only difference in the wiring arrangements shown in Fig. 5 from that shown in Fig. 3 resides in the addition of the wire 131 to which the line wire 39 is at times connected, and through the medium of which the contacts 41 of the track relay 25 are at times bridged and excluded from the line circuit described in connection with Fig. 3. The difference in the functioning of the O. S. signaling mechanism shown in Fig. 5 from that shown in Fig. 3 is most readily pointed out by considering the movement of trains.

The only movement of trains which needs to be considered to bring out the difference between the arrangement shown in Fig. 5 and Fig. 3 is that of trains moving off of the siding and the main track adjacent to such siding into a single track section.

Let us first assume that there is a train on the siding shown in Fig. 5 and that the operator wishes to let this train proceed into the single track section O. In order to do this he must clear the dwarf signal 2<sup>d</sup>, which is accomplished by moving the controller handle 50 to the lower position thereby applying negative polarity to the line circuit 39 and in turn energizing the relays 38 and ZF<sup>e</sup>. The energization of relay 38 causes a single tap of the bell 79. The energization of the relay ZF<sup>e</sup> to the reverse dotted position causes energy to be applied to the clearing wire 132 of the dwarf signal 2<sup>d</sup> through the medium of wire 78, the rest of the circuit being the same as the energizing circuit for the signal 2, thereby causing the dwarf signal to assume the clear position. During movement of the dwarf signal from its danger to its clear position the cam 129<sup>d</sup> causes the switch 121<sup>d</sup> to connect the stationary contacts of double throw switch 120<sup>d</sup> together, during the time that the contact blade 120<sup>d</sup> moves from the zero to the 45 degree position, so that the circuit including line wire 39 is not broken, as it is shifted from the wire 39<sup>1</sup> to the wire 131, and consequently the relays ZF<sup>e</sup> and 38 remain energized and no sound of the bell is given. The latter circuit for energizing the relays 38 and ZF<sup>e</sup> may be traced as follows:— starting at the negative pole of the battery 48, contact 83, wires 36 and 37, relay 38, wire 39, contact 120<sup>d</sup> of the dwarf signal 2<sup>d</sup>, wires 133, 134, 135, 131 and 43, winding of the relay ZF<sup>e</sup> wires 44, 45, common return wire C, wires 46 and 136, contact 82, back to the positive pole of the battery 48. It will be noted that the change effected in the energizing circuit for relays 38 and ZF<sup>e</sup> thus far has not caused the bell 79 to sound.

Let us now assume that the engineer in response to the clearing of dwarf signal 2<sup>d</sup> proceeds to move his train into the single track section O. As the train enters upon the fouling track circuit the relay 25 drops, but the dropping of this relay does not directly affect the bell 79, because the contact 41 of the track relay 25 is no longer in the energizing circuit of relay 38. Dropping of the track relay 25 however by reason of opening of front contact 29 does drop the home relay H<sup>2</sup> and thereby causes the dwarf signal to move to the danger position. Movement of the dwarf signal from its clear to the danger position causes the line circuit, including wire 39 to be opened through a certain arc of movement of the semaphore blade between the 45° and zero degree position of the dwarf signal 2<sup>d</sup>, as indicated by the gap in the stationary segments of contact 120<sup>d</sup>. This opening of the line circuit during movement of the semaphore blade to the danger position, contrary to that when moving from the danger position, is due to the fact that the switch 121<sup>d</sup> is a uni-directional switch and its contacts are closed only upon movement of the semaphore blade from its danger position. When this circuit is broken both the relay 38 and the relay ZF<sup>e</sup> assume their de-energized positions during this interval. Dropping of the relay ZF<sup>e</sup> has no effect on the dwarf signal 2<sup>d</sup>, because this dwarf signal is now held at danger by the home relay H<sup>2</sup>. Dropping of the relay 38 causes a single stroke of the bell 79, and picking up of the relay 38 after this arc of movement has been completed gives another tap of the bell 79, so that two taps spaced by a considerable period of time are given when the train moves off of the siding as just explained. Similarly, a train moving off of the main track parallel to such siding effects a similar spacing between two taps of the bell 79 by reason of the contact mechanism operated by the starting signal 2. The arc of movement during which the line circuit is broken when the starting signal 2 moves from clear or caution to danger is however greater than that of the dwarf signal 2<sup>d</sup>, so that the operator may distinguish by the lapse of time intervening between the two taps as to which of these two starting signals have been moved to the danger position.

In other words, the circuit arrangement shown in Fig. 5 causes two closely spaced taps of the bell 79 when a train enters either the main track or siding, and again gives two taps when the rear end of such train has completely passed the fouling track circuit at the approach to such siding and gives two taps which are spaced two or three seconds apart when a train passes off of the main track at a meeting point. It is of course understood that a single tap of the bell 79 is given each time the line circuit is either energized or de-energized by the operator. This additional distinction in the audible signals given at the tower informs the operator more definitely as to what kind of train movements are taking place at any time.

*Modification (Fig. 6)*

The modified arrangement for both controlling the take-siding signal S and the starting signals 2 and 2d and receiving O. S. signals over the same wire, shown in Fig. 6 is in many respects the same as that shown in Fig. 5. The starting signals 2 and 2d are controlled in exactly the same way as they are in Fig. 5, so that the circuits for effecting such control need not be considered at all. The take-siding signal S shown in Figs. 3, 4 and 5 is one of the type which displays an S, or other suitable indicia, which means to the engineer that he must throw the switch by hand and take the siding, when the signal mechanism thereof is de-energized; whereas the take-siding signal shown in Fig. 6 is one wherein such indicia is displayed when the signal mechanism is energized. Since the take-siding signal S in Fig. 6 is one of the normally de-energized type, a slightly different control circuit for this signal is necessary.

For convenience, this circuit will be first considered, and in order to do so let us assume that the relay ZF$^e$ has been energized by the operator in tower 10 and that the track relay 30 is de-energized possibly because there is a train approaching. Under this condition the take-siding signal S shown in Fig. 6 is energized through the following circuit:—beginning at the battery 52, wire 53, front contact 51 of the relay ZF$^e$, wire 140, back contact 141 of the stick relay SR$^2$, wire 142, back contact 143 of the track relay 30, wire 144, signal mechanism of the take-siding signal S, wires 145 and 61 back to the opposite terminal of the battery 52. With this explanation of the control of the take-siding indicator in addition to the heretofore described control of the starting signals 2 and 2d in Figs. 3, 4 and 5, the control the operator has over the signals is of course understood. It may be stated at this time that although the track switch must be thrown by hand as just mentioned, this switch may be protected against throwing it in front of a fast moving train in a manner shown in the patent to Wight, No. 1,476,866, dated Dec. 11, 1923, in each of the forms of the invention illustrated in Figs. 3, 4, 5 and 6. The circuit arrangement for effecting O. S. signaling as well as the operation of the system is most readily understood by considering what transpires during manual supervision over the starting signals 2 and 2d and the take-siding signal S in combination with movements of trains in response to these signal indications, and for this reason the operation of the system will be next considered.

Let us first assume that there is a train standing on the siding (see Fig. 6) which is an eastward bound train and faces to the right, and that the operator in tower 10 wishes this train to proceed into the single track section O, and therefore applies negative energy to the line wire 39 by moving a control handle 50 to its lower position, thus energizing the relay 38 effecting a single tap of bell 79 and energizing the relay ZF$^e$ to its negative dotted position. Since the home relay H$^2$ is energized positively the dwarf signal 2d is cleared by current flowing through contacts 51 and 49 of the relay ZF$^e$, as already heretofore explained. It may be stated here that the unidirectional contact operator shown in Fig. 6 is the same as that shown in Fig. 5 except that it is turned around, and functions only when the signal moves toward danger instead of when it moves from danger as is the case in Fig. 5. When this dwarf signal 2d moves from its normal danger to its clear position no circuit changes for the audible signal take place, because the uni-directional circuit breaker 146d operated by the dwarf signal 2d is not operated, because the arm 126d of this circuit closer only is moved while the cam 129d engages the roller in this arm 126d when moving toward the danger positions.

The circuit for energizing the relay ZF$^e$ of Fig. 6 to the negative position just mentioned may be traced as follows:—starting at the negative terminal of the battery 48 in tower 10 when the circuit controller CC is in the lower position, contact 83, wires 36 and 37, winding of the relay 38, wires 39 and 147, contact 146d operated by the dwarf signal 2d, wire 148, contact 146 operated by the dwarf signal 2, wires 149 and 150, front contact 151 of the track relay 25, wire 152, front contact 153 of the slow acting track repeater relay TP, wires 154, 155 and 156, winding of the relay ZF$^e$, wires 157, 158 and 159, common return wire C, wires 46 and 136, contact 82 back to the positive side of the battery 48. This circuit should be clearly kept in mind because it is interrupted first momentarily and then for an appreciable time after the train passes off of the siding.

Let us now assume that the engineer in response to the clearing of the dwarf signal 2d proceeds to move his train into the single stretch of track O. As soon as the train enters upon the fouling track circuit the track relay 25 is de-energized thereby opening the circuit for the relays ZF$^e$ and 38. The relay ZF$^e$, however, does not assume its de-energized position because it is slightly slow acting and dropping of the relay 25 completes a stick circuit for this relay ZF$^e$ which may be traced as follows:—beginning at the plus side of battery 92$^b$, wire 170, polar contact 171 of the relay ZF$^e$, wires 172, 158 and 157, winding of the relay ZF$^e$, wires 156, 169 and 182, front contact 183 of the relay ZF$^e$, wire 191, back contact 179, wire 184, front contact 185 of the repeater track relay TP, wire 186, contact 180 of the track relay 25 in its lower position, wires 187 and 178 back to the other or minus terminal of the battery 92$^b$. This circuit is also shown and more readily traced in Fig. 8 of the drawings. In this connection it should be noted that the direction of flow of current through the relay ZF$^e$ has not been changed in spite of the fact that a different source of energy (namely battery 92$^a$) is used in the stick circuit instead of the battery (battery 48) previously contained in the pick-up circuit for the relay ZF$^e$.

Dropping of the relay 38 causes the energizing circuit for bell 79 to be momentarily broken thereby giving a single tap, which tap is immediately followed by another tap due to energization of relay 38 through a branch circuit including a front contact 160 of the stick relay SR$^2$ and wires 161 and 162, which branch circuit shunts the front contact 151 of track relay 25 and front contact 153 of the repeater track relay TP in the energizing circuit just traced; so that eventual dropping of the relay TP and picking up of the relay 25 as the train entirely clears the fouling track circuit does not sound the bell 79, the stick circuit just traced being broken at the contact 179 at this time. In this connection it should be remembered that the stick relay SR$^2$ is immediately picked up after the track relay 25 drops and either the dwarf signal 2$^d$ or the main starting signal 2 move from their clear or caution to the danger position, as already explained.

Thus far, two very closely spaced taps of the bell 79 have been given. As the dwarf signal 2$^d$ moves beyond the 45 degree position the contact 146$^d$ associated therewith is moved to its reversed dotted position for a short period of time, such as two or three seconds, during which time the circuit heretofore traced is broken but another circuit which has been made available by the picking up of contact 165 of the stick relay SR$^2$ is closed, and may be traced as follows:—beginning at the negative terminal of the battery 48, contact 83, wires 36 and 37, relay 38, wires 39 and 164, contact 165 of the stick relay SR$^2$ in its upper position, wire 166, back contact 167 of the relay ZF$^e$, wires 168, 169 and 156, winding of the relay ZF$^e$, wires 157, 158 and 159 through the common return wire C and wires 46 and 136, through contact 82 back to the positive terminal of the battery 48. It should be noted that this energizing circuit for the relay ZF$^e$ includes a back contact 167 of this relay, so that, as soon as this relay has partially assumed its energized position, it is again de-energized in a manner similar to the way in which the energizing circuit for the usual type of doorbell is broken as the armature is attracted. This energizing circuit for the relay ZF$^e$ causes this relay ZF$^e$ to vibrate, and in turn causes the relay 38 at the tower to vibrate which in turn causes the clapper of the bell 79 to vibrate. The net result is that the bell 79 is vibrated so long as the uni-directional contact 146$^d$ of the dwarf signal breaks the normal energizing circuit under the condition assumed. As the train moves entirely off of the fouling track circuit and the track relay 25 again picks up no sounding of the bell 79 is experienced because the stick relay SR$^2$ by its front contact 160 shunts out the contacts 151 and 153 operated by relays 25 and TP respectively.

A train moving off of the main track adjacent to the siding into the stretch of single track effects O. S. signaling in substantially the same way as when moving off of the siding, that is, gives two closely spaced taps and then causes vibration of the bell clapper for a period of time. The cam portion 129 is however preferably a little longer than is the cam portion 129$^d$, so that the time during which bell 79 vibrates when one of these starting signals moves to the stop position due to the movement of a train is sufficiently different from that of the other, so that the operator may know which of these signals has moved to danger.

*Manual check of starting signal mechanism*

Let us now assume that the operator at tower 10 wishes to check up the signal mechanism of the dwarf signal 2$^d$. This may be accomplished by applying negative energy to the relay ZF$^e$ which causes the signal 2$^d$ to assume its clear position if it is in working order, and if the operator again moves the circuit controller CC to the normal position this signal 2$^d$ again returns to its danger position. Obviously, a single tap of the bell 38 was given when he applied energy to the line circuit including wire 39 and another tap of the bell was experienced when he moved the circuit controller CC to its neutral normal position. With this line circuit again de-energized the dwarf signal 2$^d$ if in proper working order returns to its normal danger position, and in so doing reverses the switch 146$^d$ and while this switch is reversed completes the following circuit:—beginning at the plus side of the battery 92$^b$, wire 170, polar contact 171 of the relays ZF$^e$, with its polar contacts in the reverse dotted position and its neutral contact in its retracted position, wires 172 and 159, common return wire C, wires 46 and 47, contact blade 34 of the circuit controller CC, wires 35, 36 and 37, winding of the relay 38, wires 39 and 147, contact 146$^d$, wires 173 and 174, back contact 175 of the relay ZF$^e$, wire 176, front contact 177 of the repeater track relay TP, wire 178 to the negative side of battery 92$^b$. This circuit is completed during the time that the switch 146$^d$ is reversed and causes a single tap of the bell 38 when this circuit is being completed and another single tap when it is again broken; so that two taps of the bell spaced a considerable distance apart are given to indicate to the operator that the signal 2$^d$ has actually responded and again returned to its normal danger position, and is in working order. This circuit is also partially shown in Fig. 10, where it may be traced more readily. What has been said about checking the dwarf signal 2$^d$ is also true of the main starting signal 2, so that this checking operation need not be repeated.

Let us now consider the distinctive O. S. signal information given when a train is approaching a meeting point, that is, when a train is moving from right to left in the stretch of single track O under two different conditions namely, (1) when the take-siding signal S is displayed, and (2) when this take-siding signal S is not displayed.

(1) Let us assume that the operator at tower 10 has energized the line circuit including wire 39 positively which energizes the relay ZF$^e$ to the position in which the polar contacts have been shown and closed the contact 51 of the relay ZF$^e$ in the energizing circuit for the take-siding signal S associated with the semaphore signal 1. If now, a train is moving from right to left in the stretch of single track O under which condition, for reasons already given, the home relay H$^2$ is de-energized and as soon as this train reaches the section containing the track relay 30, this relay assumes its de-energized position and thereby closes its back contact 143 and completes the energizing circuit for displaying this take-siding signal S through the circuit heretofore traced. As the train proceeds further in moving from right to left and reaches the fouling track circuit the relay 25 of this fouling section assumes its de-energized position and thereby breaks the energizing circuit for the relays ZF$^e$ and 38. The relay 38 assumes its de-energized position and effects a single tap on the bell 79, the relay ZF$^e$, however, does not assume its de-energized position because dropping of the contact 180 of the track relay 25 completes a stick circuit for this relay ZF$^e$, which has been heretofore traced except that the battery 92$^a$ and wire 181 are used instead of battery 92$^b$ and wire 170 respectively (see Fig. 8). When the relay TP, which is much slower acting than is the relay 25 especially in assuming its de-energized position, assumes its de-energized position the first mentioned circuit for the relay ZF$^e$ is again completed through contacts 151 and 153 of relays 25 and TP respectively including the wire 188 instead of the wire 152, so that with this first circuit again completed the relay 38 is again energized and the bell 79 is again sounded by a single tap, the stick circuit for relay ZF$^e$ being again broken by dropping of contact 185 of the relay TP. The relay TP is preferably so constructed that about one second of time is required before it assumes its de-energized position, so that the time interval between the two taps of the bell 79 just mentioned is about one second. Since the interval of time between the dropping of track relay 25 and the picking up of stick relay SR$^2$ experienced during a departing train is much shorter than one second a clear distinction between two taps of an incoming train and the two taps of an outgoing train prevails, and in this connection it should be remembered that a train moving from left to right in addition to giving two very closely spaced taps on the bell 79 also causes the bell to vibrate for an interval of time.

As the train passes entirely into the siding and again clears the fouling section, the track relay 25 again assumes its energized position thereby again causing the relays 25 and TP to be out of step, so to speak, in which case the track relay 25 is first picked up and a short time thereafter the repeater track relay TP is picked up. This picking up of these relays effects another double tap on bell 79 for the reason that the relay 38 is de-energized so long as the relays 25 and TP are out of step. During this time the relay ZF$^e$ is again stuck up through a stick circuit which is the same as the stick circuit heretofore traced except that the wire 189 is substituted for the wire 186 (see Figs. 6 and 8). Since the relay TP requires less time in assuming its energized position than it does in assuming its de-energized position, when its circuit is made and broken respectively, the taps of the bell 79 are spaced much closer together when the fouling track circuit is cleared than when it is being occupied. The net result is, that a train moving from right to left into the main track or siding at a meeting point causes the bell to give two spaced taps spaced about a second apart and when the train enters the siding and causes it to sound another two taps which are spaced only about a half a second apart when it has passed wholly within the siding limits.

It should be noted that had the relay ZF$^e$ been energized negatively instead of positively when it was energized to display the take-siding signal, the results upon the approach of a train at meeting point F from the single track section O would have been the same. In this event, however, the battery 92$^a$ would have been substituted for the battery 92$^b$, this provision in order that the relay ZF$^e$ is stuck up by current flowing in the proper direction.

(2) When a train moving from right to left in the single track section O takes the main track because the take-siding signal is not displayed the audible O. S. signal given is exactly the same as that just described, namely two taps of the bell spaced about a second apart are given, because the relays 25 and TP are out of step, when the train enters the fouling track circuit and two closely spaced taps are given when it has passed entirely off of this track circuit. Since the relay ZF$^e$ is not energized under this condition no stick circuit for this relay is completed, but circuits for relay 38 are completed.

These latter circuits are shown in Fig. 9 and may be traced as follows, proceeding on the assumption that the relay ZF$^e$ was last energized positively and for this reason the polar contacts are to the right:—beginning at plus side of battery 92$^a$, wires 178 and 187, contact 180 of track relay 25 in its lower position, wire 186, contact 185 of relay TP, wires 184, back contact 179 of relay SR$^2$, wire 191, contact 183 of relay ZF$^e$ in its lower position, wire 192, contact 165 of relay SR$^2$, wires 164 and 39, winding of relay 38, wires 37, 36 and 35, contact 34 of circuit controller CC, wires 47 and 46, common return wire C, wires 159 and 172, polar contact 171, wire 181 back to the negative side of battery 92$^a$, and the same circuit except that wire 189 is substituted for wire 186.

The summary of the distinctive signals which may be given over a single line wire and by a single bell by the arrangement shown in Fig. 6 of the drawings will now be given briefly. Manual movement of either the starting dwarf signal 2$^d$ or the main starting signal 2 from a clear position to the danger position causes the bell to sound three taps, the first of which is given when the relay ZF$^e$ is manually de-energized by the operator in the tower and the other two taps are given at the beginning and end respectively of the time during which the uni-directional circuit controller contacts 146 or 146$^d$ as the case may be assumes the reverse position by reason of movement of the corresponding signal to its danger position. In this connection, it should be noted that if the starting signal assumes the caution position when the operator de-energizes the relay ZF$^e$ the first tap of the bell will occur a very short time before the second two taps occur, whereas if this signal assumed its clear position when the relay ZF$^e$ is de-energized a longer time elapses between the first and second tap on the bell because the semaphore signal had to make the additional movement from its 90 degree to the 45 degree position, so that, as a matter of fact the block operator may determine whether the corresponding home relay is energized positive, negative or is de-energized. This is also true, when a starting signal is moved to its de-energized position by a train moving from left to right. In this event, however, two very closely spaced taps on the bell are given followed by a vibratory or chattering sound of the bell as heretofore explained, the net result being, that if a train starts off of the siding or main track when the corresponding starting signal is at caution the chattering of the bell 79 will very closely follow the two closely spaced taps of this bell, whereas if it proceeds in response to a clear signal, the additional time required for the signal to move from clear to caution intervenes between the two taps and the chatter of the bell 79. A train moving from right to left effects two taps of the bell spaced about a second apart when this train enters upon the fouling section, and effects two very closely spaced taps of the bell when it again leaves this fouling section, the spacing between the taps being accomplished by the delay of the repeater track relay TP in its operation behind that of the track relay 25, the relay ZF$^e$ being stuck up through a separate circuit while the main circuit for this relay is broken during this lapse of time. If the relay ZF$^e$ is in its de-energized position a train moving from right to left into the passing siding limits effects energization of relay 38 so long as track relays 25 and 30 are out of step, thus giving the same kind of audible information as when this relay ZF$^e$ is energized under the same movement of traffic.

It is desired to be pointed out that although contacts 16 and 17 have been illustrated in each of the forms of the invention shown in Figs. 3 to 6 inclusive these contacts may be omitted, if desired. If these contacts are omitted it is possible for the block operators to clear both ends of a stretch of single track for the entrance of trains therein, in which event the first train to enter selects the direction of traffic permitted to run in such stretch of track.

It is desirable that a train approaching a siding should have advance information that it should take such siding, in order that it may slow down and open the switch. This is taken care of in the embodiments of the invention thus far described when the block operator controls the signals in the regular way for a meet. To explain, referring to Figs. 1 and 3, assume a west bound train approaching the siding F and that the block operator wishes this train to take this siding and wait to make a meet with an east bound train. The block operator displays the take-siding signal S at the east end of siding F in the same way as previously described. It is contemplated that he will also clear the starting signal 2 at the east end of the next adjacent siding E preparatory to advancing the east bound train toward the meeting point. When the starting signal 2 at the east end of siding E is thus cleared, its circuit controller 17 is opened, interrupting the circuit for the line relay H$^3$ in the stretch of single track N, and in turn de-energizing the line relays H$^5$ and H$^7$, and holding the starting signals 7 and 7$^d$ at the west end of siding F at stop. Upon de-energization of the line relay H$^7$, the circuit for the relay PS is broken (see Fig. 3) and the signal 3 of the stretch of track O (see Fig. 1) in the rear of the signal 1, as well as the signal 1, are caused to assume the caution position, thus providing what is commonly known as the double distance control. Thus, the west bound train in question receives a caution indication at the signal 3 next in the rear of the signal 1 at which the take-siding signal is displayed; and in accordance with this caution indication, the engineer will slow down his train, and be ready to stop for the opening of the switch to take the siding.

*Structure (Figs. 7A and 7B)*

In Figs. 7A and 7B is shown a system which is very similar to that shown in Fig. 6 especially as far as the operator's control over the relay ZF$^e$ and the audible signal information given due to the passage of trains in different directions, and the like, is concerned. In the system shown in Figs. 7A and 7B, however, a guiding hand, so to speak, is not only displayed to inform the engineer as to how he shall control his train, but the switch at the entrance to the siding assumes the proper position in each case, this being accomplished by a remotely controlled switch machine SM which must assume the proper position before a particular signal indication can be given.

This switch machine is one of the usual construction and in the particular arrangement shown includes a direct current motor DM having an armature 200, brushes 201 and 202, field winding 203 and a group of contacts operated mechanically when the switch machine motor is operated. Of these contacts the contacts 204, 205, 206 and 207 are operated in any suitable way so as to move in accordance with the operation of the switch machine and the switch bar connecting this machine to the switch 208, whereas the contact 209 is operated through lost motion mechanism and is shifted from one to the other extreme position quickly near the end of the stroke of the switch machine, this contact 209 interrupting the operating circuit for the motor and partially completing another circuit at the end of the operating stroke; this other circuit being used for reversing the switch machine which circuit must be completed at another point before the motor is actually reversed. This switch machine SM may, in case of emergency, due to lack of power, or the like, be operated by and through the medium of a handle, which handle if inserted in the machine breaks the operating circuit thereof at the handle contact 210, so that the switch machine can not be operated by power so long as the handle is operatively connected thereto.

By reason of the fact that in the arrangement shown in Figs. 7A and 7B, a switch machine is used at each entrance to each of the various sidings of the single track system shown in Fig. 1, the apparatus governing the entrances to a single track section becomes a localized interlocking system; and for this reason the signals governing the entrance to, and the departure of trains from, the sidings and main track adjacent thereto must be stop-and-stay signals as indicated by the square ended blades of signals 2, 2$^d$, 1 and 1$^s$. In this connection it should be noted that the "stop-and-stay diverging route signal" 1$^s$ is used instead of the take-siding signal S shown in Figs. 3 to 6 inclusive. This stop-and-stay diverging route signal 1$^s$ must be read in connection with the stop-and-stay signal 1 and these two signals must not be passed unless one of them is indicating proceed. This diverging route signal 1$^s$ is a two-position, "zero to forty-five degree position signal" and is controlled by the fouling track circuit relay 25, the switch machine and the relay ZF$^e$ in a manner more clearly pointed out hereinafter. Also, the stop-and-stay signals 2 and 2$^d$ must not be passed if at stop in accordance with well established rules of railway practice.

In order to control the switch machine SM by the relay ZF$^e$ under predetermined traffic conditions in each direction for a predetermined distance from the switch 208, certain switch machine control relays are required. In the particular arrangement shown a normal relay NR, a reverse relay RR, a control relay CR and a supplemental control relay CR$^1$ are employed. In order to determine the conditions of traffic for a predetermined distance toward the east, that is toward the right in Fig. 7B, a relay AR has been provided which in the arrangement shown is controlled by the first three track circuits toward the east of the signal 1. The circuit for energizing this relay may be traced as follows:—beginning at the terminal B of a suitable source of energy, wire 214, front contact 215 of the track relay shown, wire 216, front contact 217 of another track relay, wire 218, front contact 219 of the track relay 30, wire 220, winding of the relay AR, wire 221 back to the common return wire C connected to the other side of said source of energy. This circuit also has a multiple branch including wire 212 and front contact 213 of the stick relay SR⁴. By this arrangement the relay AR is energized when there is an eastbound train on the track circuit controlling track relay contact 215. The circuit for the home relay H¹ in the particular arrangement shown in Figs. 7A and 7B may be traced as follows:—beginning at the battery 225, pole changer contact of pole changer switch 115 operated by the signal 1, wires 227 and 228, front contact 114 of the track relay 33, wire 231, front contact 113 of the fouling track circuit relay 24, wires 234 and 235, front contact 112 of the track relay 23 connected to the track circuit of the main track adjacent to siding F, wire 238, front contact 15 of the fouling track circuit relay 25, wire 241, winding of the home relay H¹ to the common return wire C connected by the pole changer switch 115 to the battery 225 (see Fig. 7A). Since the signal 1 normally assumes its danger position the home relay H¹ is normally energized negatively and the polar contact assumes its left or reverse position as indicated in Fig. 7B.

Further additional apparatus used in the system shown in Figs. 7A and 7B includes contacts 244, 245, 246 and 247 operated by the semaphore blades of signals 2, 2ᵈ, 1ˢ and 1 respectively. Each of these contacts is closed if the signal with which it is associated is in the danger or stop position.

It may be pointed out at this time that the signal 3 assumes its caution position in Fig. 7B because the home relay H³ is energized in the reverse position. It is not considered necessary to trace this circuit specifically.

Since the circuit controller CC controls the switch machine SM, and since this switch machine if operated will remain in the operated position in spite of the fact that the controller CC is returned to the neutral position it is desirable to indicate in what extreme position the circuit controller CC has last been moved, so that, this indicator in fact indicates the position of such switch machine provided the switch machine has been operated as a result of movement of the controller to such extreme position. In the particular arrangement shown the cover 250 of the circuit controller CC is provided with an opening through which the letter N or R, indicating normal and reverse respectively, is visible when the indicator or exhibitor 251 assumes a corresponding position. This indicator 251 is provided with a slot 252 in which a pin projecting from the angle lever 253 is adapted to move. From this it readily appears that if, with the indicator in the position shown, the handle 50 is moved to the upper position the indicator 251 will not be shifted, whereas if this handle 50 is moved to its lower position, the indicator 251 is moved to the right where it is stopped by the stop pin 254 in a position to cause the letter R to be visible through the opening in the cover 250.

In order to give an audible signal at the tower when the switch machine starts and again when it has completed its stroke an additional relay SMI is employed. This relay is normally de-energized and is momentarily energized, say for one half second, when the switch machine starts and again just before it completes its stroke. The energizing circuit for this relay SMI during these periods (see Figs. 7B and 8) may be traced as follows: beginning at battery 52, wires 261, 314, 315 and 316, contact 206 of the switch machine SM, wire 317, winding of the relay SMI, wires 326, 158 and 159 to the common return wire C connected to the other side of said battery. It should be noted that the wire 39 is carried through the contact 327 of the relay SMI when this contact is in its retracted position.

Operation (Figs. 7A and 7B)

In considering the operation of the system shown in Figs. 7A and 7B, let us first assume a simple case in which there is an eastbound train on the siding F, and the operator wishes to allow this train to proceed eastbound into the stretch of single track O. Since the siding is not track circuited, the presence of this train does not affect the system. Let us further assume that the stretch of single track O is blocked for west bound traffic either because there is an eastbound train moving in this stretch or because the starting signals at the east end thereof are manually held at stop. In order for the train in question to move off of the siding, the operator moves the handle 50 of the circuit controller CC of mechanism CFᵉ in the tower 10 to the lower position, so as to energize the relay ZFᵉ negatively and to cause it to assume the reverse dotted position. The circuit for energizing this relay is exactly the same as that shown in Fig. 6 except that it includes the back contact 327 of the relay SMI, and therefore need not be traced. This circuit is however shown in Fig. 8 where it can be readily followed. With the relay ZFᵉ in the reverse position an energizing circuit for the reverse control relay RR for controlling the switch machine SM is closed, which may be traced as follows:—beginning at the battery 52, wires 53 and 53ᵃ, front contact 51 of the relay ZFᵉ, wire 54, polar contact 49 of the relay ZFᵉ, in its reverse dotted position, wires 78¹ and 256, back contact 257 of the normal relay NR, winding of the reverse relay RR, wires 258 and 259 to the common return wire C connected to the other side of this battery 52 through wire 260.

Under conditions assumed, the control relay CR assumes its energized position, the energizing circuit for which may be traced as follows:—beginning at the battery 52, wires 261 and 262, front contact 263 of the relay AR, wires 264, 265 and 266, front contact 267 of the home relay H¹, wires 268, 269 and 270, winding of the control relay CR, wires 280 and 281, crank circuit controller 210, wires 282, front contact 283 of the fouling track circuit relay 25, wire 284, contacts 247 and 246 operated by the semaphore signals 1 and 1ˢ, wire 285, contacts 245 and 244 operated by the semaphore signals 2ᵈ and 2 respectively, wires 286, 287, 158 and 159 to common return wire C connected to the other side of the battery 52. This circuit can most readily be traced in Fig. 11 wherein this circuit alone is shown. Having now explained how the control relay CR is energized, and having pointed out how the relay RR is energized in response to negative energization of the relay ZFᵉ, let us now proceed to trace the circuit for the switch machine which will operate the switch 208 to the reverse position:—beginning at the battery 290, wires 291 and 292, front contact 293 of the reverse relay RR, wires 294 and 295, brush 202, armature 200, brush 201, wires 296 and 297, back contact 298 of the normal relay NR, wire 300, contact 209 of the switch machine SM, wires 301 and 302, field winding 204 of the switch machine motor, wires 303 and 304, front contact 305 of the control relay CR, wires 306 and 307 back to the battery 290. With this circuit energized the switch machine will operate the switch 208 to the reverse position and near the end of this stroke will open the circuit just traced by shifting its contact 209. It should be noted that the armature of the motor DM is shunted through the medium of back contacts 357 and 358 of relays CR and CR$^1$ respectively, through a circuit readily traced in Fig. 7B. This shunting circuit is provided to assure the switch machine against operation by unauthorized current, and is closed when the relays CR and CR$^1$ are in their retracted positions.

With the switch machine SM in the reverse position and the switch 208 in a position to allow the train on the siding F to move into the stretch of single track O, and with the relay ZF$^e$ energized to a position corresponding to that of the switch machine, a circuit for clearing the dwarf signal 2$^d$, is closed which may be traced as follows:—beginning at the battery 52, wires 53 and 53$^a$, front contact 51 of the relay ZF$^e$, wire 54, pole contact 49 in the reverse dotted position, wires 78$^1$, 78, wire 308, front contact 83 of the home relay H$^2$, polar contact 92 of the same relay, clearing wire 132, signal mechanism of the dwarf signal 2$^d$, wire 309, contact 204 of the switch machine SM, wires 310, 311, 312, 313 and 259 to the common return wire C connected to the other side of the battery 52. The completion of this circuit causes the dwarf signal 2$^d$ to assume the clear position, so that the train on the siding may proceed in the stretch of single track O.

Signal 1$^s$ is also cleared at this time but this is of no particular importance because there is no train moving from right to left in the single track section O and no train is permitted to enter this single track section because the dwarf signal 2$^d$ has broken the energizing circuit for the home relay H$^3$ so that all the west bound signals assume the stop position. Further, if there had been a train in this section the dwarf signals 2$^d$ could not have been cleared, so that there is no real conflict in the signal indications, as a matter of fact, even though both the dwarf signal 2$^d$ and the diverging route signal 1$^s$ are clear at the same time.

*Audible indication of switch machine operation*

Let us consider at this time how the operator at tower 10 has been informed as to the response of the switch machine SM to his movement of the circuit controller CC to the lower position. Just after the switch machine had begun its operating stroke the switch machine indicating relay SMI was momentarily energized and during this time broke the closed circuit for the relays 38 and ZF$^e$. The relay 38 was completely de-energized for this time and therefore caused the bell 79 to sound two taps spaced by this short time assumed to be less than half a second. The relay ZF$^e$ on the other hand did not assume its de-energized position, because the following circuit having current of the proper polarity to energize the relay ZF$^e$ negatively flowing therein is completed during the interval of time:—beginning at the negative side of battery 92$^b$, wires 178, 187 and 332, contact 327 of relay SMI in its raised position, wires 39$^a$ and 147, contact 146$^d$, wire 148, contact 146, wires 149 and 150, front contact 151 of the track relay 25, wire 152, front contact 153 of the relay TP, wires 154, 155 and 156, winding of the relay ZF$^e$, wires 157, 158 and 172, contact 171 of the relay ZF$^e$, in its negative position, wire 170 to the positive side of battery 92$^b$. This circuit is also shown in Fig. 8. In other words with the relay SMI energized the relay ZF$^e$ is energized to the position in which its polar contacts are positioned and the circuit for the relay 38 is broken. Since the circuit controller CC must assume one or the other extreme position when the switch machine is operated this breaking of the circuit including relay 38 will of course sound bell 79. With the switch 208 thrown to the reverse position and the dwarf signal 2$^d$ assuming its clear position the engineer of the train on siding F will at once proceed into the stretch of single track, and in so doing causes the sounding of the bell 79 at tower 10 in a manner as already clearly described in connection with Fig. 6 of the drawings.

*Approach locking*

Figure 11:
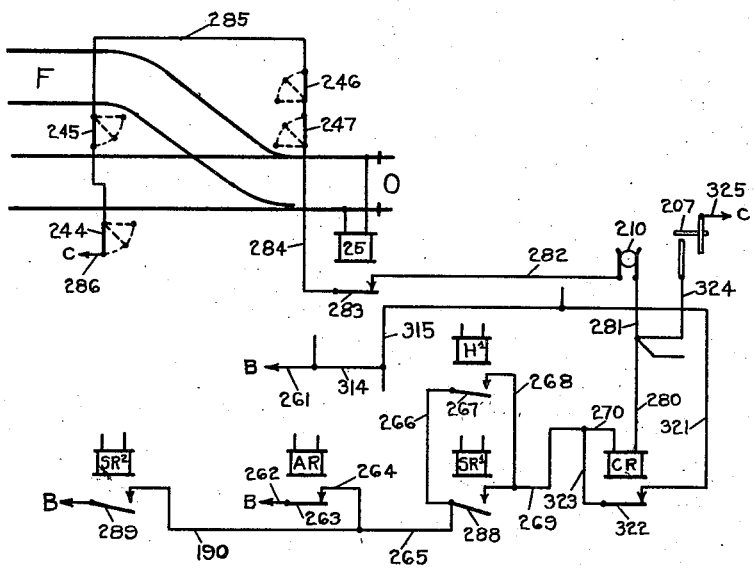

From the circuit for the control relay CR heretofore traced it is apparent that all of the signals at the east entrance to the siding F must be at stop and the home relay H$^1$ or the stick relay SR$^1$ as well as the relay AR or the stick relay SR$^2$ must be up in order that the initial energizing circuit for the control relay CR may be completed (see Figs. 7B and 11). In this connection it should be noted that the front contact 267 of the home relay H$^1$ may be shunted by the contact 288 of the stick relay SR$^1$ and that the front contact 263 of the relay AR may be shunted by the wire 190 and front contact 289 of the stick relay SR$^2$, so that the approach locking is effective only to approaching trains. In other words, if a train is moving in the section controlled by home relay H$^1$ in a direction away from the switch 208 the stick relay SR$^1$ will be up and the home relay H$^1$ need not be energized; also, that if a train is moving in the section controlling relay AR in a direction away from the switch 208 in which event the stick relay SR$^2$ is stuck up, this relay AR need not be energized; so that the net result is that the relays H$^1$, SR$^1$, AR and SR$^2$ complete the energizing circuit for the control relay CR if there are no trains approaching the switch 208 within distances considered dangerous in each direction from this switch. It may be stated at this time that the stick relay SR$^1$ is controlled in exactly the same way for west bound traffic passing the signals 1 or 1$^s$, by these signals and associated apparatus as the stick relay SR$^2$ is controlled by east bound traffic moving by the signal 2 or 2$^d$ and similar associated apparatus, this stick relay SR$^1$ not being used at all in the usual A. P. B. signaling systems. The pick-up and stick circuits for this relay SR$^1$ have not been shown specifically, but the stick contact 224 has been illustrated.

*Switch machine stick characteristic*

It should, however, be noted that the circuit for the control relay CR need not be completed after the switch machine has once been started on its operating stroke, for as soon as this occurs a stick circuit for the control relay CR is completed which may be traced as follows:—beginning at the battery 52, wire 261, 314, 315, and 321, front contact 322 of the control relay CR, wires 323 and 270, winding of the control relay CR, wires 280 and 324, contact 207 of the switch machine SM, wires 325, 313 and 259 to common return wire C connected to the other side of battery 52. The circuit just traced is employed so that if the switch machine has once started to operate the entrance of a train into the fouling track circuit, including track relay 25, will not stop the switch machine at some intermediate point, it being considered to be more dangerous to leave the switch 208 at an intermediate position than to have it set for the siding or main track as the case may be. A train entering upon a fouling track circuit at low speed by dropping of the contact 283 of the track relay contained therein, would tend to de-energize the control relay CR. This circuit is also shown in Fig. 11 where it may readily be traced. The net result is, if the control relay CR has once been energized and the switch machine has started on its operating stroke a distance to close contact 207, as a result of the energization of one or the other of relays RR and NR, the switch machine will remain energized until it has completed its stroke even though a train moves into the fouling track circuit.

Let us now assume that there is an east bound train on the main track adjacent to siding F. With a train on this main track the track relay 23 (see Fig. 7A) assumes its de-energized position and by reason of dropping of its front contact 112, de-energizes the home relay H¹.

Let us now assume that the operator at tower 10 wishes to allow this train on the main track to enter the stretch of single track O, and that the switch is reversed. In order to do so he moves the controller CC to the upper position and thereby displays the letter N and applies positive energy to the relay ZF$^e$ thus energizing this relay ZF$^e$ to its normal position. With the relay ZF$^e$ energized positively an energizing circuit for the normal relay NR is completed which may be traced as follows:—beginning at battery 52, wires 53 and 53$^a$, front contact 51 of the relay ZF$^e$, wire 54, polar contact 49 of this same relay assuming its normal position, wires 55¹, 328, back contact 329 of the reverse relay RR, wire 330, winding of the normal relay NR, wires 331 to 259 to the common return wire C connected to the other side of battery 52 by wire 260.

The energization of the normal relay NR will not, however, apply energy to the switch machine SM because the control relay CR is not up. This control relay CR is not energized at this time because the approach locking is effective, this because the home relay H¹ is de-energized and the stick relay SR¹ which has a front contact 288 in multiple with the front contact 267 of the relay H¹, is also not energized, this because the train standing on the main track parallel to siding F is headed eastward and has not picked up this stick relay SR¹ so that the control relay CR remains de-energized. Also, if the train previously considered had not passed off of the track circuit containing the track relay adjacent signal 4, such failure of departure of the train does not change conditions as far as energization of the relay CR is concerned, because the departure of this eastwardly moving train picked up the stick relay SR² the front contact 289 of which shunts front contact 263 of the relay AR.

*Automatic time element release*

The approach locking features as thus far described, which have been provided to guard against the throwing of a switch in front of a fast moving train, would consequently lock such switch against movement under conditions which commonly occur in practice unless supplemental unlocking means is provided. The safety of the supplemental unlocking means, namely the supplemental control relay CR¹, is based on the premise that it is safe to operate the switch machine if the fouling track circuit containing track relay 25 is not occupied and the signals at such switch have been at danger for a period of time sufficient to either stop a train or which train if it is not stopped has already passed by such switch or is occupying the fouling track circuit.

With the control relay CR de-energized for reasons heretofore given, and with the relay ZF$^e$, and the normal relay NR energized, a circuit for energizing the supplemental release control relay CR¹ is completed which may be traced as follows:—beginning at the battery 52, wires 261, 314, 334 and 335, front contact 336 of the relay NR, wires 337, winding of the supplemental control relay CR¹, wire 338, back contact 339 of the control relay CR, wires 340, and 281, crank circuit controller 210, wire 282, front contact 283 of the fouling track circuit relay 25, wire 284, contacts 247 and 246 operated by signal blades of signals 1 and 1$^s$ respectively, wire 285, contacts 245 and 244 operated by signal blades of signals 2$^d$ and 2 respectively, wires 286, 287, 158 and 159 to common return wire C connected to the other side of battery 52 by wire 260.

This supplemental control relay CR¹ is one of the retarded type, and may be retarded by any suitable means, such as, clock mechanism, a dashpot, a mercury contact delayed in completing a circuit on the hour glass principle, or the like, and for convenience a dash-pot 342 has been shown conventionally for this purpose.

After an interval of time deemed sufficient to allow a train moving at high speed to have passed the switch 208 if it already occupied the section controlling the home relay H¹ or the relay AR depending on the direction of movement of the train, or during which time if the engineer of the train has acted upon the signal indication must have brought his train to a stop before it reached the switch 208, or if he did not act thereon probably has passed the switch, and which time may for convenience be assumed to be about two minutes, the front contact 343 of this retarded or slow acting supplemental control relay CR¹ is closed. With this contact 343 closed and the relay NR up, the switch machine is energized by a circuit in which the flow of the current through the armature is in the opposite direction from that which flowed in the circuit heretofore traced for this machine with the relay RR up, but the current in the field winding is in the same direction as before, so that the torque and rotation of the motor are reversed. This circuit comprises battery 290, wires 291 and 344, contact 298 of the relay NR in its raised position, wires 297 and 296, brush 201, armature 200, brush 202 of the switch machine motor, wires 295 and 294, contact 293 of the reverse relay RR in its lower position, wire 345, contact 209 of the switch machine, wires 346 and 302, field winding 203 of the switch machine motor, wires 303 and 347, front contact 343 of the supplemental control relay CR¹, wires 348 and 307 back to the battery 290.

With this circuit completed, the switch machine SM is again returned to its normal position, and with the train in the main track adjacent to siding F holding the home relay H¹ in its retracted position and with the relay ZF$^e$ energized positively, a circuit for energizing the starting signal 2 as heretofore traced is completed; whereas no circuit for the signal 1 is completed because the home relay H¹ is in its de-energized position. The energizing circuit for the signal 2 may be traced as follows:—beginning at the battery 52, wire 53 and 53ᵃ, front contact 51 of the relay ZFᵉ, wire 54, polar contact 49 in its normal position, wires 55¹, 45 and 55², front contact 56 of the home relay H², polar contact 57 of this same relay, clearing wire 58 of the signal 2, the signal control mechanism of signal 2, wire 349, contact 204, of the switch machine in its normal position, wires 350, 312, 313, 259, common return wire C connected to the other side of battery 52. With the starting signal 2 in its clear position which is only possible if the switch 208 is set for the main track the train in question may proceed into the stretch of single track O in accordance with the signal indication afforded by the usual A. P. B. signal apparatus.

It should be noted that if the train just mentioned had not yet entered the main track adjacent to siding F, and had been back a distance beyond the track circuit controlling track relay 33 that the control relay CR would have assumed its energized position, and the time delay necessitated by the use of the supplemental control relay CR¹ would have been avoided; this because the home relay H¹ would have assumed its energized position under this condition. Further, if a train had just backed off of siding F and for this reason the switch at the west end of siding F had been open at the time it was desired to operate the switch machine SM the switch box contact 60¹ would have been closed, in which even the home relay H¹ would have been energized even though track relays 24 and 33 were de-energized.

Further, if such train had been a west bound train which passed either the signal 7 or the signal 7ᵈ, and in so doing picked up the stick relay SR⁷, the front contact 116 of this stick would have been up to maintain the relay H¹ energized.

The switch box contact 60¹ and stick relay contact 116 are provided to shunt the contacts 114 and 113 of track relays 33 and 24, mainly for the reason that under the conditions of traffic when one or the other or both of these contacts are closed it is safe to have the signal at least indicate caution.

Let us now assume that there is a train moving from east to west in the stretch of single track O, which train is to take the siding at the meeting point F, and the operator moves the controller CC to the lower position which movement displays the letter R and energizes the relay ZFᵉ to its negative or reverse position before the train just mentioned reaches the track circuit controlling track relay having front contact 215 adjacent to signal 4. With the relay ZFᵉ energized negatively the reverse relay RR is energized and since the control relay CR under the conditions assumed is in the energized position the switch machine is started upon its operating stroke, a double tap of the bell 79 being given when it starts and another double tap being given when it has completed such operating stroke. These taps on the bell 79 are given as a result of the momentary energization of the relay 38 due to the momentary energization of the relay SMI during operation of the switch machine (see Fig. 8) the relay ZFᵉ being held up by a circuit heretofore traced including a front contact of relay SMI (see Fig. 8 also) during these periods of time.

When this switch machine has moved the switch 208 to the reverse position, that is to a position so that the train may take the siding, and with the relay ZFᵉ energized a circuit for energizing the diverging route signal 1ˢ is completed which may be traced as follows:—beginning at the battery 52, wires 53 and 53ᵃ, front contact 51 of the relay ZFᵉ, wire 54, polar contact 49 in the reverse dotted position, wires 78¹, 78 and 352, front contact 353 of the fouling track circuit relay 25, wire 354, mechanism of the 45 degree diverging route signal 1ˢ, wire 355, contact 205 of the switch machine SM, wires 356, 311, 312, 313, 259 and common return wire C leading to the other terminal of battery 52. Attention is particularly directed to the fact that none of the signals at a switch, such as 208, can assume a proceed position unless the switch machine controlling it and the control relay, such as ZFᵉ, are positioned correspondingly or are in step, so to speak; it is by virtue of this fact that all signals will assume the stop position, a necessary requisite for picking up the control relay CR, when it is attempted to operate the switch machine by energizing the control relay. It should be noted that even though the switch machine is in the reverse position and the control relay ZFᵉ is in the reverse position, that the dwarf signal 2ᵈ is not clear; this because the home relay H² is de-energized for the reason that there is a train moving in the stretch of single track O from right to left and home relay H² can not be picked up as long as west bound traffic is moving in this single track section O on account of the interlocked features present in any A. P. B. system as readily understood by those skilled in the art of absolute-permissive block signaling.

*Train making pass from rear*

Let us assume that the train in question in response to the display of the stop-and-stay diverging route signal 1ˢ takes the siding F and finds the starting dwarf signal 7ᵈ at the west end of the siding F at stop and is held on this siding because the operator at tower 10 wishes the next train in the rear, which is a superior train, to pass the train on siding F, this other and superior train having already entered the stretch of single track O but not having yet reached any one of the track circuits controlling the relay AR. Under the assumed condition, the operator in tower 10 will move the circuit controller CC to the raised position thereby displaying the letter N and in turn energizing the relay ZFᵉ to its normal position. With the relay ZFᵉ energized, the home relay H¹ energized because the siding is not track circuited and the relay AR is energized, the normal relay NR and the control relay CR will assume their energized positions for reasons heretofore given, thereby causing the switch 208 to be operated by the switch machine SM to its normal track position. With the switch machine assuming its normal position and the relay ZFᵉ energized to its normal position, and with the home relay H² held de-energized because west bound direction of movement of trains has been set up in stretch of single track O, an energizing circuit for the signal 1, which moves this signal to the caution position, is completed. This circuit may be traced as follows:—beginning at the battery 52, wires 53 and 53ᵃ front contact 51 of the relay ZFᵉ, wire 54, polar contact 49 in its normal position, wires 55¹, 55 and 360, front contact 361 of home relay H¹, wires 362 and 363, signal mechanism of the signal which moves the semaphore blade to the forty-five degree or caution position, wire 364, contact 205 of the switch machine in its normal position, wires 365, 350, 312, 313, 259, common return wire C and wire 260 leading to the other side of the battery 52. As the train in question moves from east to west in the stretch of single track O and approaches the meeting point F, it finds the main signal 1 at caution which informs the engineer that he may take the main track at meeting point F at a speed ready to stop at the next signal. Had the operator desired to allow this second train to move by meeting point F at high speed he would have cleared signal 7 located at the west end of siding F and in so doing would have caused this signal by reversal of its pole changing contact 115 to apply positive energy to the home relay H¹ which in turn would have caused the signal 1 to assume its clear position. After the superior train has entered the stretch of single track N a distance permitting the dwarf signal 7ᵈ to assume either the caution or clear position, the negative energization of the relay ZFʷ (not specifically shown) at the west end of siding F by the operator who allows the inferior train on the siding to follow the superior train in the single track N with the usual signal protection.

*Trains making a meet*

Let us now assume that there is an east bound train on the main track adjacent siding F and that it is to wait to meet a west bound train in the stretch of single track O. Let us further assume that the switch machine SM is already assuming the reversed position and the relay ZFᵉ is energized so that the diverging route signal 1ˢ is displayed. Although the switch machine and the relay ZFᵉ are also in a position to display the dwarf signal 2ᵈ this signal is not displayed because the home relay H² is down because west bound traffic is moving in the stretch of single track O or else west bound traffic has been selected for the stretch of single track by clearing of one or the other of the starting signals at the east end of the stretch of single track O before the relay ZFᵉ was energized. Since everything is in condition for the west bound train to move into the siding F, let us assume that it does so. During entrance of this train upon the fouling track circuit containing relay 25 a back contact (not shown) of this relay in series with a contact closed between 43 and 45° (not shown) on signal 1ˢ completes a pick-up circuit for stick relay SR¹, which relay is then stuck up through the stick contact 224 of this relay SR¹ and a back contact on relay H¹ in series therewith.

After the train in question has entered the siding F the switch machine SM may immediately be operated to the normal position without the two minute delay necessitated by the use of the supplemental control relay CR¹ bearing in mind that relay AR and SR¹ are energized (see Fig. 11). In other words, the relay CR is energized, and as soon as the operator effects energization of the normal relay NR, the switch machine is operated to the normal position, the starting signal 2 is cleared and the train on the main track may proceed into the stretch of single track O. It should be noted that the train on the main track parallel to siding F, which presumably entered this main track from the west end and in so doing picked up the stick relay for signal 8 (not shown) so that its front contact shunts the front contact of the home relay of signal 8 (not shown) in the energizing circuit of the control relay CR (not shown) at the west end of siding F, so that the approach locking for the mechanism at the west end is not effective under the conditions assumed and no further delay in the trains making the meet is experienced. The starting signal 7ᵈ at the west end of siding will of course assume the clear position as soon as the track switch at the west end of siding F is open, assuming of course that there is no train approaching in the single track section N, under the assumed condition the train on the siding F can immediately proceed westward into single track section N.

*Distinctive audible O. S. signaling*

Let us now consider the movements of trains over a single track railway involving a plurality of sidings as occur in actual practice. As heretofore mentioned, the various bells employed in the towers have distinctive sounds, so that the tower men can readily distinguish at which switch location a certain train movement or switch operation takes place, and for this reason let us assume that the bells at control points CEᵉ, CFʷ and CFᵉ located at tower 10 have a high, a medium and a low tone respectively, and that the bells at control points CGᵉ and CGʷ located at tower 11 have a high, a medium and a low tone respectively. Let us further assume that each of the switches assume their normal or main track positions and that each of the relays ZEᵉ, ZFʷ and ZFᵉ etc. assume their normal de-energized positions, and that there is a west bound train moving in the single track section O and there is an east bound train on the main track at the passing siding E. Under the conditions assumed the towermen at towers 10 and 11 will of course know of the presence of these trains and the direction in which they are moving, and in accordance with this information will get into telephonic communication with each other, and with the advice of the train dispatcher will decide to allow these trains to meet, say at siding F.

In order to make this meet the towerman at tower 10 places the controller CC associated with the control mechanism CEᵉ and CFʷ in a position to energize the corresponding relays positively and will place the controller associated with mechanism CFᵉ so as to energize the relay ZFᵉ negatively. In response to making these circuit changes he will receive a tap on the high, the medium and the low tone bell in accordance with the operation of these controllers. In addition to these three taps he will receive a double tap on the low tone bell when the switch machine SM of switch 208 at the east end of siding F starts to move to the reverse position and experiences another double tap on this low tone bell when this switch has completed its movement. Further, the starting signal 2 located at the east end of the siding E will assume its clear position, as will the signal 8 located at the west end of siding F. Also, after the switch 208 at the east end of siding F has been reversed the dwarf signal 2ᵈ associated therewith will assume its clear position and diverging route signal 1ˢ associated therewith will assume its 45 degree or proceed position. The signal 2 at the east end of siding F of course remains at stop so as to hold the east bound train on the main track of meeting point F. The attendant at tower 11 will move the circuit controllers CC associated with mechanism CG$^e$ and CG$^w$ to the upper position so as to energize the relay associated therewith positively in response to which a single tap is given on the medium tone and the high tone bell respectively located at tower 11. Movement of the relay ZG$^e$ (not specifically shown) to its normal energized position causes the signal 1 associated therewith to assume the clear position, movement of the relay ZG$^w$ (not specifically shown) to the positive energized position causes the signal 7 associated with the west end of siding G to remain in its danger position because the dwarf signal 2$^d$ at the east end of siding F is clear, so that, east bound direction of travel has been set up in the stretch of single track O. Since it is desired to first have west bound traffic move over stretch of track O the attendant at tower 10 will momentarily de-energize relay ZF$^e$. This will put the dwarf signal 2$^d$ at the east end of siding F to stop and the starting signal 7 at the west end of siding G will move to clear, which change in this signal 7 in turn causes all of the east bound home relays in the stretch O to assume their de-energized position, and since this includes the relay H$^2$ shown in Fig. 7B the dwarf signal 2$^d$ at the same location will remain in its danger or stop position even after the relay ZF$^e$ is again energized by the operator. The diverging route signal 1$^s$ at the east end of siding F will however again assume the 45° position.

The system has now been set up to make a meet at siding F and the signals and switches are so positioned that the west bound train must take the siding at meeting point F. As the east bound train at siding E proceeds in accordance with the clear position of signal 2 located at this siding, two closely spaced taps of the high tone bell at tower 10 are given as the fouling track circuit relay is dropped and the stick relay associated with signal 2 is picked up; and immediately after these two taps this same bell vibrates for a short time indicating that the signal 2 at the east end of siding E has moved to the danger position in response to the passage of the east bound train. As the rear end of this train passes off of the end of the fouling track circuit at the east end of siding E no sound is given for reasons heretofore pointed out. We may assume that in the meantime, the west bound train running in single track section P has reached the main track at siding G. As this west bound train enters upon the fouling track circuit at the east end of siding G, two taps in the medium tone bell at siding 11 are given, which taps are spaced apart about one second due to the fact that the fouling track circuit relay at the east end of siding G has dropped and the repeater track relay TP for this location has dropped after a time. As the rear end of this west bound train moves entirely into the main track adjacent to siding G, and the tail end of this train clears this fouling track circuit, two closely spaced taps of this same medium tone bell at tower 11 are given, these taps being due to picking up of this fouling track circuit relay and its associated repeater relay. As this west bound train proceeds into the single track section O two closely spaced taps of the high tone bell in tower 11 are given as the fouling track circuit relay at the west end of siding G is de-energized and the stick relay associated with signal 7 at this same siding G is picked up. Immediately following these two taps of the high tone bell at tower 11, this same high tone bell vibrates for a time indicating that the signal 7 has moved to the danger position in response to passage of the train into stretch of single track O.

We may now assume that the east bound train moving in the stretch of single track N is entering the main track adjacent siding F and in so doing gives two taps of the medium tone bell in tower 11 spaced about a second apart upon entering the fouling track circuit at this end of siding F, and when the rear end of this train passes entirely beyond this fouling track circuit two closely spaced taps of this same bell are given so that the attendant at tower 10 knows that the east bound train has reached its destination for meeting the west bound train, bearing in mind that signal 2 is at stop thus holding the east bound train.

We may now assume that the west bound train proceeds into the siding in response to the display of the diverging route stop-and-stay signal 1$^s$ located at the east end of siding F. As this west bound train enters the siding F two taps of the low tone bell 79 shown in Fig. 7A of the drawings are given, spaced about a second apart, this sounding being followed with two more closely spaced taps when the rear end of the west bound train has passed entirely into the siding F.

As soon as the east bound train passed entirely into the main section parallel to siding F it was proper for the towerman at tower 10 to reverse his controller associated with mechanism CF$^w$ (thereby putting it in the lower position and energizing the relay ZF$^w$ (not specifically shown) to the negative position, and we may assume that he did do this as quick as possible. With this relay ZF$^w$ energized negatively the supplemental control relay associated therewith is energized and its front contacts close after the period of time heretofore mentioned, after which the switch machine associated with relay ZF$^w$ is operated to its reverse position, so that the west bound train which has just been assumed to have taken the siding F may immediately, or after a minimum amount of delay, proceed westwardly into the stretch of single track N. At the same time, the operator at tower 10 may move the circuit controller CC (shown in Fig. 7A) to the upper position whereby the relay ZF$^e$ assumes its positively energized position, which in turn because the switch machine SM and relay ZF$^e$ are out of step causes the signal 1$^s$ to assume the danger position if it has already assumed a proceed position. All of the signals at the east end of siding F are now in the danger position. Movement of the circuit controller CC to the upper position, resulting in positive energization of the relay ZF$^e$ causes the normal relay NR to be energized, and since the relays AR, SR$^1$ and 25 are energized the control relay CR is also energized, the switch machine SM shown in Fig. 7B is operated to its normal position; the operator at tower 10 being informed of this operation of the switch machine by two very closely spaced taps on the low tone bell when this switch machine starts and two more closely spaced taps on this same bell when it has completed its stroke. As soon as the switch machine has returned to its normal position the signal 2 located at the east end of the siding F is cleared and the east bound train may proceed through the stretch of single track O, through the main track parallel to siding G, the stretch of single track P and so on, the attendant at tower 11 being informed as to the location of this train as it enters and leaves the various meeting points, and single track sections. Similarly, the west bound train is now free to move through the stretch of single track N, through meeting point E, single stretch of track N, etc., the progress of which will be noted by the operator at tower 10 by the audible sounds given by the various bells located in his tower. Various other train movements might be discussed, but this is believed unnecessary because the principal of leading a train into the main track or the siding as conditions require and holding it there to allow one or more others to pass has already been quite fully discussed. Also, the audible signals are the same for each individual train movement by a meeting point and for each switch machine operation, so that it is deemed unnecessary to consider more fully the operation of the system.

*Reversing switch machine at intermediate point in stroke*

It sometimes happens that when a switch machine is operated it only partially completes its stroke because something such as a lump of coal, or the like, gets between the switch points and the main rail, and under this condition, it is preferable to be able to operate the switch back to its original position. Obviously, this can not be done unless special means is provided for shifting the reversing switch drum 209 to the opposite position. The specific feature whereby this may be accomplished has not been shown in Fig. 7B, but in practice comprises two electromagnets one connected across one pair of brushes cooperating with contact 209 so that the contact drum 209 is shifted when current is applied to one or the other of wires 300 and 345 at a time and when this particular wire is not already connected to the field of the switch machine through the medium of contact 209. In other words, the reversing switch 209 is operated to the opposite position from that which it assumes mechanically by the switch machine when this switch machine completes its stroke, but if this switch machine does not complete its stroke this contact 209 is not shifted to the opposite position mechanically, but is shifted electro-magnetically as soon as energy is applied to the wire for operating this switch machine to such opposite position. Since the apparatus for accomplishing this function does not form a part of the present invention, this apparatus has not been specifically illustrated, and reference may be had to the patent to Howe, No. 1,466,903, September 4, 1923, which shows a specific disclosure of this means for reversing a switch machine at midstroke. The switch machine shown in Fig. 7B may be considered to be the same as that shown in said Howe patent and for further information in regard to the crank circuit controller 210 heretofore mentioned and other parts of the switch machine, reference may be had to this Howe patent.

In this connection it should be noted that the switch machine relay SMI is in its de-energized position throughout substantially the whole operating stroke of the switch machine, and that the relay ZF$^e$ may be reversed at any time so long as this relay SMI is in its de-energized position. Further, that reversal of the relay ZF$^e$ with the control relay CR stuck up by its stick circuit causes the switch machine SM to be reversed, because the application of potential to the reversing wire before the machine has completed its previous operating stroke causes the contact 209 to be reversed by the pole changing magnets disclosed in the patent to Howe, 1,466,903 and causes the switch machine to be returned to its original position. In this way, the switch machine may be operated back and forth until the obstacle such as a lump of coal, has been crushed or been displaced in such a way that the switch machine may complete its stroke. This ability to reverse a switch machine when its mechanism is at an intermediate point in its stroke is considered an essential feature in any circuit arrangement for controlling a switch machines for the reasons above given, so that the arrangement shown in Fig. 7B affords the same control over the switch machine, with respect to reversal of the machine at an intermediate point in its stroke, commonly afforded in interlocking systems and like systems employing power-operated means for operating track switches.

*Summary*

It may be of interest to note that the control relay CR assumes its energized position whenever all of the signals located adjacent the switch machine controlled by this relay CR are in the danger position, in spite of the fact that there is a train approaching within the distances or limits in which track circuits control the relays AR and H$^1$, providing none of these signals have indicated proceed since a train has entered these limits; this being true because the partial circuit leading from the control relay CR to the battery 52, and including the front stick contact 322 of this relay CR, is in multiple with a circuit including front contacts of these relays and permits energization of this relay CR, this being proper because if these signals are at stop the signal 3 (as shown in Fig. 7B) in the stretch of single track O will be at caution and the signal 8 located at the other end of the passing siding F will be at caution, so that the engineers on trains passing these distant signals will have signal indications instructing them to proceed ready to stop within vision.

Generally speaking, it may be said, that the four signals at the entrance to a single track section will be governed jointly by the direction of traffic set up in the single track section at the entrance to which these signals are located and by the position of the track switch located at the entrance thereto. In other words, considering the switch 208 at the east end of siding F, if the switch machine is normal and the direction of traffic selected is from west to east the signal 2 only can clear. If, however, the direction of traffic selected is from east to west then the signal 1 only can clear. Assuming now that the switch machine is in its abnormal or reverse position, if the direction of traffic selected is from east to west the diverging route signal 1$^s$ only can assume its proceed position whereas if the direction of traffic selected with the switch machine reversed is from the west to east, then both the dwarf signal 2$^d$ and the diverging route signal 1$^s$ can be cleared, the clearing of this diverging route signal 1$^s$ means nothing however since there can be no train approaching the signal 1$^s$ coming out of the single track section O.

The approach locking features forming part of the system shown in Figs. 7A and 7B have heretofore been discussed on the assumption that the approaching train is entering the zone in which approach locking is provided with the signal, such as the signals 3 and 8 for instance, indicating clear traffic conditions. It is however desired to be pointed out that if the approaching train enters this locking zone when the signal, such as signals 3 and 8, is at caution, because the signals 1, 1s, 2 and 2d are at stop, this approach locking is not effective. This phase of the operation is readily apparent by looking at Fig. 11, in which it readily appears that if the control relay CR is once up, and providing the signals 1, 1s, 2 and 2d associated with the particular control relay CR in question have not been moved from the danger position after the train in question has entered such approach locking zone, the relay CR is stuck up by its stick contact 322. In other words, if the control relay ZF<sup>e</sup> is left in its de-energized position the approach of a train toward the switch which is controlled by this control relay ZF<sup>e</sup> may be operated without incurring the amount of delay imposed by the use of the control relay CR¹, but may immediately be operated as soon as this relay ZF<sup>e</sup> is energized to a position to operate the switch machine. This feature of the system adds to the facility of switch operation and train movements in that the delay of two or three minutes heretofore mentioned need not be imposed even though there is a train approaching on the approach locking zone in the event that this train has accepted a caution or danger signal upon its entrance upon such zone. In considering certain movements of trains in connection with the operation of the various control relays and the movement of other trains, which movements have not been specifically considered, this feature of the system should be borne in mind in determining the facility afforded by the system.

The supplemental control relay CR¹ is made slow acting to safeguard against the sudden operation of the track switch in front of an approaching train without first giving the engineer of such train signal information restricting his movement of the train; that is, it is proposed that if energy is applied to the various relays for controlling a switch machine, that these relays can not respond unless the signals at such switch indicate danger, and the next signal in each direction governing the movement of trains toward the said switch are at caution. If there should be a train moving toward the switch at high speed within certain limits heretofore mentioned, the control CR for such switch can not pick up, and the picking up of the supplemental control relay CR¹ as a result of the control relay CR being de-energized, is so much delayed that this high speed train will either have passed the switch, will be occupying the fouling track circuit so that relay 25 will be down under which condition the switch machine can not be initiated, or this train will come to a stop before it reached the switch. In practice, the time which should elapse before the front contact 343 of the supplemental control relay CR¹ is closed has been found to be about two or three minutes.

Having thus shown and described a series of systems all of which are directed to the broad idea of using the safety afforded by the absolute-permissive block signaling system for single track railways and combining therewith manual supervision over the signals alone, or of the signals and switches associated with the various sidings, for the purpose of dispatching and directing the movement of trains; it is desired to be understood that the invention may be applied to other types of signal systems, and that any amount of refinement, as to the distinctive signal information given to the towerman, the degree of signal information given to the engineer, and the extent of facility afforded, may be resorted to by making suitable changes and modifications for this purpose, and that various changes and additions may be made to adapt the invention to the various types of signal systems such as A. P. B. light signal systems, neutral relay or alternating current absolutely-permissive block signaling systems, and the like, without departing from the spirit and scope of the invention or the idea of means underlying the same.

What is desired to be secured by Letters Patent is:—

1. A railway system having a siding and a main track parallel thereto; a plurality of signals at the entrance to said siding governing the entrance and departure of trains to and from said siding, main track and single track sections; a relay for said siding location; a line wire connecting said relay to suitable control and indicating means at a distant point; means for controlling said signals jointly by said relay and means corresponding to prevailing traffic conditions; and means for causing said indicating means to respond to the movement of trains into and out of said siding and main track through the medium of said line wire.

2. A single track signaling system comprising; a single track section divided into sub-sections by insulated joints; wayside signals for governing the movement of trains in one direction over said section; wayside signals for governing the movement of trains in the other direction over said section; control means which places a signal governing a particular direction of traffic at stop when the next signal in advance is at stop; another control means for rendering said first mentioned control means inactive and places such signal at caution if the next signal in advance is at stop providing a train has just moved by such signal in advance in the direction in which such signal governs traffic; manually operable means at a distant control point for holding the first signal of the signals governing the movement of traffic in a particular direction in the single track section at stop; and means effective if the first signal for governing movement of traffic in one direction is released manually from its stop condition for placing the last signal, and in turn the remaining signals, of the signals governing the movement of traffic in the opposite direction at stop, whereby the direction in which trains may travel in such single track section is governed by said manually operable means.

3. In combination, a stretch of railway track, signals located at intervals through the stretch for governing traffic in one direction, other signals located at intervals for governing traffic in the other direction, manually operable means at a distant control point for holding the first signal of signals governing each direction of traffic at danger, another means for causing all signals in the rear of a signal for a certain direction of traffic to indicate danger if such signal indicates danger, means controlled by each signal while moving to danger as it is passed by by a train for rendering said another means ineffective to hold at danger a signal in the rear of such signal at danger, and means effective if the first signal of the signals governing traffic in one direction is permitted to assume its clear condition as a result of the manipulation of the manually controllable means to cause the last signal, and in turn the rest of the signals, governing traffic in the other direction to assume their danger condition.

4. A single track railway system as specified in claim 3 terminating in a main track and a siding, a switch for said siding, a power-operated switch machine for operating said switch, and means for preventing the first signal of the signals governing traffic moving into the single track section from the main track assuming its clear condition unless said switch is set for the main track.

5. A single track railway system as specified in claim 3 terminating in a main track and a siding, a switch for said siding, a power-operated switch machine for operating said switch, a relay controlled over a line wire from a remote point for controlling said switch machine, and means for preventing the switch machine responding to a change in the position of said relay unless all of the signals at said siding governing traffic into and out of the single track section are at stop.

6. A single track railway system as specified in claim 3 terminating in a main track and a siding, a switch for said siding, a power-operated switch machine for operating said switch, a relay controlled over a line wire from a remote point for controlling said switch machine, and means for preventing the switch machine responding to a change in the position of said relay unless all of the signals at said siding governing traffic into and out of the single track section indicate stop, and means including said line wire for informing an operator at said remote point when said switch machine starts operating and again informing him when it has completed its operating stroke.

7. In an interlocking system including a single track section equipped with absolute permissive block signaling including track relays, a main track and a siding at one end of the single track section, signals at the junction of said single track section, main track and siding, control and indicating means located at a distant point, a control relay located near said signals, a line circuit connecting said control and indicating means and said control relay, and means for controlling said signals by said control means and for giving distinctive indications by said indicating means upon the movement of a train by said signals in each direction through the medium of said line circuit.

8. A central control train dispatching system for single track railways equipped with absolute permissive block signaling and having main tracks and passing sidings, joining successive single track sections, a starting signal governing the movement of trains from a main track into a single track section, another starting signal governing the movement of trains from the siding adjacent said main track into the same single track section, automatic means responsive to traffic conditions in the single track section, and a manually controlled relay controlled from a distant point which if in one position causes one of the starting signals to respond to said automatic means and when in another position causes the other starting signal to respond to said automatic means.

9. A central control train dispatching system for single track railway equipped with absolute permissive block signaling and having main tracks and passing sidings joining successive single track sections, a starting signal governing the movement of trains from a main track into a single track section, another starting signal governing the movement of trains from the siding adjacent to said main track into said single track section, automatic means responsive to traffic conditions in the single track section, and a manually controlled relay which if in one position causes one of the starting signals to respond to the condition of said automatic means, when in another position causes the other of the starting signals to respond to said automatic means and when in a third position permits neither of said signals to respond to said automatic means.

10. A centralized traffic control system for railways comprising, a manually operable circuit controller, a relay located at a siding distant from said controller, a circuit connecting said controller and relay, an indicating device in said circuit at the controller end of said circuit, and means for energizing both said indicator and said relay by either of two sources of energy one source of which is located near said controller and the other source of which is located near said relay.

11. A centralized traffic control system for railways comprising, a manually operable circuit controller, a relay located at a siding distant from said controller, a circuit connecting said controller and relay, an indicating device in said circuit at the controller end of said circuit, a source of energy at the circuit controller end of said circuit which through said circuit controller may be applied to said relay and said indicating device, and means at the relay end of said circuit for maintaining said relay energized without energizing said indicating device.

12. A centralized traffic control system for single track railways comprising, a manually operable circuit controller, a relay located at a siding distant from said controller, a circuit connecting said controller and relay, an indicating device in said circuit at the controller end of said circuit, a source of energy at the circuit controller end of said circuit which through said circuit controller may be applied to said relay and said indicating device, and means at the relay end of said circuit including a front contact of said relay for maintaining said relay energized provided said relay has already assumed its energized position and without energizing said indicating device.

13. A railway system having a siding, a plurality of signals at the entrance to said siding governing the entrance and departure of trains to and from said siding and the main track adjacent said siding, a power-operated switch machine for operating a switch leading to said siding, means for controlling said signals in accordance with the operated position of said switch machine, a relay at said siding for controlling said switch machine, control means for manually operating said relay from a distant point, said switch machine responding to a change in the position of said relay only if there are no trains within certain limits of said switch at the time said relay is changed, and supplemental means for controlling said switch in accordance with the position of said relay effective only after an interval of delay.

14. A railway system having a siding, a plurality of signals at the entrance to said siding governing the entrance and departure of trains to and from said siding and the main track adjacent said siding, a power-operated switch machine for operating a switch leading to said siding, means for controlling said signals in accordance with the operated position of said switch machine, a relay at said siding for controlling said switch machine, control means for manually operating said relay from a distant point, said switch machine responding to a change in the position of said relay only if there are no trains within a certain zone near the middle of which said switch is located at the time said relay is changed, and supplemental means for controlling said switch in accordance with the condition of said relay effective only after a lapse of time and then effective only if there are no trains within a more restricted zone adjacent said switch.

15. A railway system having a siding, a plurality of signals at the entrance to said siding governing the entrance and departure of trains to and from said siding and the main track adjacent said siding, a power-operated switch machine for operating a switch leading to said siding, means for controlling said signals in accordance with the position said switch machine is assuming at the time and traffic conditions ahead, a relay at said siding for controlling said switch machine, control means for operating said relay from a distant point, said switch machine responding to a change in the condition of said relay only if there are no trains within a certain zone near the middle of which said switch is located at the time said relay is changed, a fouling track circuit at said switch, supplemental means for operating said switch machine in response to the position said relay assumes effective only after an interval of delay and then effective only if said fouling track circuit is unoccupied.

16. A railway system having a siding, a plurality of signals at the entrance to said siding governing the entrance and departure of trains to and from said siding and the main track adjacent said siding, a power-operated switch machine for operating a switch leading to said siding, means for governing said signals to give indications corresponding to traffic conditions ahead and the operated position of said switch machine, a relay at said siding for controlling said switch machine, control means for manually controlling said relay from a distant point, a fouling track circuit at said switch, said switch machine responding to a change in the position of said relay only if said fouling track circuit is unoccupied and there are no trains within certain distances in both directions from said switch moving toward said switch, and supplemental means for controlling said switch in accordance with the position of said relay even if there is a train moving toward said switch effective only after an interval of delay.

17. In a central control train dispatching system, the combination with a control relay located at a distant siding, signals located at such siding controlled jointly by a track relay at such siding and said control relay, a circuit for said control relay including control means and indicating means located at the central control point, and means for transmitting distinctive code signals over said circuit to said indicating means.

18. In a central control train dispatching system, the combination with a control relay located at a distant siding, signals located at such siding controlled jointly by a track relay at such siding and said control relay, a circuit for said control relay including control means and indicating means located at the central control point, and means located at such siding for cutting off the flow of current from said control means to said control relay without affecting the condition of energization of said control relay.

19. In a central control train dispatching system, the combination with a control relay located at a distant siding, signals located at such siding controlled jointly by a track relay at such siding and said control relay, a circuit for said control relay including control means and indicating means located at the central control point, and means for transmitting distinctive code information over said circuit to said indicating means without interfering with the continued energization of said control relay.

20. In a central control train dispatching system, the combination with a single track railroad having a plurality of passing sidings, two entering and two starting signals located at each end of each passing siding for governing the movement of trains into and out of the main track and siding of such passing siding respectively, a common return wire leading along the entire railroad, and means controlled from a distant point including one and only one line wire in addition to said common return wire for each end of said siding for directing traffic from a single track section into and out of the main track and siding respectively of a passing siding.

21. In a central control train dispatching system, the combination with a single track railroad having a plurality of passing sidings, two entering and two starting signals located at each end of each passing siding for governing the movement of trains into and out of the main track and siding of such passing siding respectively, a common return wire leading along the entire railroad, and means including one and only one line wire in addition to said common return wire for each end of each siding for directing traffic from a single track section into and out of the main track and siding respectively of a passing siding controlled from a distant point, and means for signaling to the operator at such distant point the entrance and departure of trains to and from the ends of said passing sidings over said corresponding line wires and common return wire.

22. In a central control train dispatching system, the combination with a single track railroad having a plurality of passing sidings having a track switch at each end, a switch machine for each track switch, two entering and two starting signals located at each end of each passing siding for governing the movement of trains into and out of the main track and siding of such passing siding respectively, a common return wire leading along the entire railroad, means including one and only one line wire in addition to said common return wire for each end of each siding for controlling said switch machine and for directing traffic through the medium of said signals from a single track section into and out of the main track and siding respectively of a passing siding controlled from a distant point, and means for signalling to the operator at such distant point the entrance and departure of trains to and from each end of each passing siding over said line wires and said common return wire.

23. A train dispatching system for dispatching the movement of trains over a railway system by wayside signal indications comprising, an electro-responsive device having two distinctive energized conditions and a de-energized condition located at each of a plurality of distant sidings and each controlled from a local point and over a single line circuit, a switch machine at each of said sidings each controllable by its corresponding relay, signals for the main track and the side track of each siding controlled jointly by the position of the corresponding switch machine and the relay associated therewith, and means functioning so that if a train approaches said signal while such signal indicates proceed said switch machine cannot be operated in spite of the condition of said relay.

24. A switch and signal system for controlling the movement of trains at a distant point comprising, a distant track switch operable by a power operated switch machine associated therewith, signals associated with said track switch for governing the movement of trains over said switch in its different positions, relay means at said switch location manually controllable from a non-lockable local lever for controlling said switch machine and signals, a detector track circuit for preventing operation of said switch machine when such detector track circuit is shunted by a train, and approach locking means located at the switch for preventing operation of such switch machine even though said relay means has been operated to establish an alternate route in response to movement of said non-lockable lever if a train has entered an approach zone when either of said signals indicated proceed but which will not prevent operation of such switch machine if a train entered such zone while said signals indicate stop.

25. A switch and signal system for controlling the movement of trains into the side track or main track of a siding located at a distant point, a track switch for determining whether an approaching train shall enter the side track or main track, a switch machine for operating said track switch, signals at said track switch for governing the movement of trains into said side track and main track, a distant signal in the rear of said first mentioned signals controlled to indicate adverse traffic conditions when either of said first mentioned signals indicates stop, a relay at the switch machine controlled from a lever at the control point for controlling said switch machine, and means for preventing operation of such switch machine in response to operation of said relay if an approaching train arrives at said distant signal when indicating proceed.

26. A switch and signal system for controlling the movement of trains into the side track or main track of a siding located at a distant point, a track switch for determining whether an approaching train shall enter the side track or main track, a switch machine for operating said track switch, signals at said track switch for governing the movement of trains into said side track and main track, a distant signal in the rear of said first mentioned signals controlled to indicate adverse traffic conditions when said main track signal indicates stop, a relay at the switch controlled from a lever at the control point for controlling said switch machine, and means for preventing operation of such switch machine in spite of the operation of said relay to a position to effect such operation of the switch machine if an approaching train reaches said distant signal when indicating proceed.

27. A centralized traffic control system for railroads comprising, a manually operable circuit controller located convenient to a train dispatcher, a relay located at a siding distant from said controller, a circuit connecting said controller and relay, an indicating device connected in said circuit at the controller end of said circuit, a source of energy for energizing said relay and indicating device when said controller closes said circuit, a signal governed by said relay, and means for opening said circuit if said signal has responded to a change in the condition of said relay.

28. A centralized traffic control system for railroads comprising, a manually operable circuit controller located convenient to a train dispatcher, a relay located at a siding distant from said controller, a circuit connecting said controller and relay, an indicating device connected in said circuit at the controller end of said circuit, a source of energy for energizing said relay and indicating device when said controller closes said circuit, a track switch having a power operated switch machine governed by said relay associated therewith for operating the same located at the relay end of said circuit, and means for opening said circuit when said switch machine has responded to a change in the condition of said relay.

29. A centralized traffic control system comprising; a railway track having an outlying passing siding; a track switch at each end of said passing siding; two signals at one end of said siding for governing the entrance of trains into the siding and main track of said passing siding; two signals at the other end of said passing siding governing the departure of trains therefrom; a control relay at each end of said passing siding; a fouling track circuit for each end of said passing siding including the usual track relay; a manually operable lever for each control relay located locally convenient to a train dispatcher; an indicator near each of said levers; a circuit for each control relay including the corresponding lever, the corresponding indicator, a front contact of the corresponding track relay and a source of energy in series; means for controlling said signals in accordance with the position of the corresponding track switch, traffic conditions in advance of said signals and subject to the operated position of the corresponding control relay; whereby said signals are governed jointly in accordance with the position of the corresponding track switch, traffic conditions ahead and the wishes of the train dispatcher, and said indicator informs the train dispatcher of the entrance of a train upon the fouling track circuit in response to the opening of said front contact.

30. In a centralized traffic control system; the combination with a railway track having an outlying passing siding; a track switch at the entrance end of said siding; a signal for governing the entrance of trains to the main track of said passing siding; a signal for governing the entrance of trains to the siding of said passing siding; a three position control relay which if in one energized position permits one of said signals to automatically indicate conditions of traffic ahead, which if in the other energized position permits the other signal to automatically indicate traffic conditions ahead, and which if in the de-energized condition permits neither of said signals to indicate traffic conditions ahead but holds both of said signals at stop; a line circuit for controlling said control relay from the train dispatcher's office; and means including said line circuit to inform the train dispatcher as to the passage of trains by said track switch.

31. In a centralized traffic control system; the combination with a railway track having an outlying passing siding; a track switch at the entrance end of said siding; a signal for governing the entrance of trains to the main track of said passing siding; a signal for governing the entrance of trains to the siding of said passing siding; a three position control relay which if in one energized position permits one of said signals to automatically indicate conditions of traffic ahead, which if in the other energized position permits the other signal to automatically indicate traffic conditions ahead, and which if in the de-energized condition permits neither of said signals to indicate traffic conditions ahead but holds both of said signals at stop; a fouling track circuit at said switch including the usual detector track relay; a line circuit for said control relay including a front contact of said detector track relay, a lever, an indicator located at the train dispatcher's office and a source of energy in series; whereby said train dispatcher may energize said control relay in either direction and is informed through the medium of said detector track relay and indicator as to the entrance of a train to or the departure of a train from said fouling track circuit.

32. A centralized traffic control system for railroads comprising, a manually operable circuit controller located convenient to a train dispatcher, a relay located at a siding distant from said controller, a circuit connecting said controller and relay, an indicating device connected in said circuit at the controller end of said circuit, a source of energy for energizing said relay and indicating device when said controller closes said circuit, and means for distinctively interrupting said circuit at the distant siding in accordance with the direction of train movement through said siding and in turn distinctively actuating said indicating device.

33. A centralized traffic control system for railroads comprising, a manually operable circuit controller located convenient to a train dispatcher, a relay located at a siding distant from said controller, a circuit connecting said controller and relay, an indicating device connected in said circuit at the controller end of said circuit, a source of energy for energizing said relay and indicating device when said controller closes said circuit, and means for transmitting distinctive codes from said siding to such train dispatcher by distinctively interrupting said circuit at the siding end in accordance with the direction of train travel over said siding and by the transmission of such distinctive codes distinctively actuating said indicating device.

34. A centralized traffic control system for railroads comprising, a manually operable circuit controller located convenient to a train dispatcher, a relay located at a siding distant from said controller, a circuit connecting said controller and relay, an indicating device connected to said circuit at the controller end of said circuit, a source of energy for energizing said relay when said controller closes said circuit, a track switch having a power operated switch machine governed by said relay for operating the track switch located at the relay end of said circuit, and means for transmitting a distinctive code in response to operation of said switch machine as a result of a change in the condition of said relay to distinctively actuate said indicator.

35. In a train dispatching system, the combination with a single track section diverging at each end into two diverging tracks through the medium of a track switch, starting signals at each end of said single track section for governing the departure of trains from the diverging tracks into said section and governed in accordance with the position of the track switch and traffic conditions ahead, a control relay at each end of said single track section for holding the signals at that end at stop irrespective of traffic conditions, a line circuit for each of said relays, a lever for each of said line circuits located at a dispatcher's office, whereby the signal corresponding to the position of the track switch may be cleared if traffic conditions in advance are favorable by operation of the corresponding lever by the dispatcher, and interlocking means for preventing the clearing of a starting signal at one end of said single track section if a starting signal at the other end of said section indicates proceed.

36. In a train dispatching system, the combination with a single track section diverging at each end into two diverging tracks through the medium of a track switch, starting signals at each end of said single track section for governing the departure of trains from the diverging tracks into said section and governed in accordance with the position of the track switch and traffic conditions ahead, entering signals at each end of said single track section for governing the entrance of trains into the diverging tracks from the single track section and governed in accordance with the position of the track switch and traffic conditions ahead, a control relay at each end of said single track section for holding the starting and entering signals at that end at stop irrespective of traffic conditions ahead of said signals, a line circuit for each of said control relays, a lever for each of said line circuits located at a dispatcher's office, whereby the signals corresponding to the position of the track switch may be cleared if traffic conditions in advance are favorable by operation of the corresponding lever by the dispatcher, and interlocking means for preventing the clearing of a starting signal at one end but permitting clearing of the entering signal at that end in the event a starting signal at the other end of said section indicates proceed.

37. In a train dispatching system, the combination with a single track section diverging at each end into two diverging tracks through the medium of track switches, signals at each end of said single track section for governing the departure of trains from the diverging tracks into said section in accordance with the position of the track switch and traffic conditions in advance of said signals, a control relay at each end of said single track section for holding the signals at that end at stop irrespective of traffic conditions, a line circuit for each of said control relays, a lever for each of said line circuits located at a dispatcher's office, an indicator in each of said line circuits responsive to the integrity of said line circuit, whereby the signal corresponding to the position of the track switch may be cleared if traffic conditions in advance are favorable by operation of the corresponding lever by the dispatcher and an indication may be transmitted to the dispatcher by the interruption of said line circuit, and interlocking means for preventing the clearing of a signal at one end of said single track section if a signal at the other end of said section indicates proceed.

38. In a train dispatching system, the combination with a single track section diverging at each end into two diverging tracks through the medium of track switches, starting signals at each end of said single track section for governing the departure of trains from the diverging tracks into said section in accordance with the position of the track switch and traffic conditions ahead of said signals, entering signals for governing the passage of trains from the single track section into the diverging tracks, a polar relay at each end of said single track section for holding the signals at that end at stop irrespective of traffic conditions, a line circuit for each of said polar relays, a lever for each of said line circuits located at a dispatcher's office for applying current of a polarity to operate said polar relay to a predetermined position for clearing the signals governing traffic into or out of one diverging route or the other, a switch machine for operating said track switch in accordance with the polarity of energy applied to said control relay, whereby the switch machine may be operated to a particular position and the signals corresponding to that position may be cleared if traffic conditions in advance are favorable by operation of the corresponding lever by the train dispatcher to a position to apply the proper polarity to said polar control relay, and interlocking means permitting the clearing of a starting signal at one end of said single track section and permitting the clearing of an entering signal at the other end of said single track section in accordance with the sequence of operation of the levers of the two line circuits leading to said polar control relays.

39. In a train dispatching system, the combination with a single track section diverging at each end into two diverging tracks through the medium of a track switch, starting signals at each end of said single track section for governing the departure of trains from the diverging tracks into said section in accordance with the position of the associated track switch and traffic conditions ahead, entering signals at each end of said single track section for governing the movement of trains from the single track section into said diverging tracks, a polar control relay at each end of said single track section for holding the starting and entering signals at stop irrespective of traffic conditions ahead, a line circuit for each of said polar relays, a lever for each of said line circuits located at a dispatcher's office for applying current of one or another polarity to said polar relay or allowing said polar relay to assume its de-energized condition, two groups of intermediate signals located along said single track section one group governing traffic conditions in one direction and the other group governing traffic conditions in the opposite direction, whereby the starting and entering signals corresponding to the position of the polar control relays may be cleared if traffic conditions in advance are favorable by operation of the corresponding lever by the dispatcher, and interlocking means functioning through the medium of said intermediate signals for preventing the clearing of a starting signal at one end of said single track section but permitting the clearing of the associated entering signal in the event a starting signal at the opposite end of said single track section is at proceed.

40. A system of control for operating a track switch of a railway track, the combination with a stretch of single track containing a track switch, a home signal for governing the passage of a train over said track switch, relay means which responds to the approach of a train toward but not away from said home signal, a switch machine for operating said track switch, a control relay controlled from a distant point for controlling said switch machine, and approach locking means located at the switch for preventing operation of said switch machine irrespective of the condition of said control relay unless said home signal is at stop and also if said relay means responded while said home signal was indicating proceed.

41. A system of control for operating a track switch of a railway track, the combination with a stretch of single track containing a track switch, a home signal for governing the passage of a train over said track switch, a track circuited approach zone, a switch machine for operating said track switch, a control relay adjacent said switch machine and controlled by a lever at a distant point for controlling said switch machine unless operation thereof is prevented, and means located at said switch machine and including a stick relay for preventing operation of said switch machine in response to a change in the condition of said control relay due to operation of said lever to establish an alternate route corresponding to the new position of said controlled relay if there is a train approaching which entered said control zone when said home signal was at proceed or which entered said control zone when said home signal was at stop but which home signal was changed to proceed during the approach of said train in said zone.

42. A system of control for operating a track switch of a railway track, the combination with a stretch of single track containing a track switch, a home signal for governing the passage of a train over said track switch, a track circuited approach zone, a switch machine for operating said track switch, a control relay controlled from a distant point for controlling said switch machine unless operation thereof is prevented, and means for preventing operation of said switch machine in response to a change in the condition of said control relay if there is a train approaching which entered said control zone when said home signal was at proceed or which entered said control zone when said home signal was at stop but which home signal was changed to proceed during the approach of said train in said zone but not preventing such operation of the switch machine when there is a departing train traveling in said zone.

43. In a system for indicating at a central control point the progress of trains along the trackway of a railway, the combination with a track relay responsive to the presence of a train on a section of trackway, and of means for indicating a change in the energized condition of such track relay for a period of time after such change takes place comprising, another relay controlled by said track relay, and a circuit portion closed only when one of said relays is in its energized condition and the other is in its de-energized condition.

44. A system of control for operating a track switch of a railway track, the combination with a stretch of single track containing a track switch, two home signals one for governing the passage of a train over said track switch in one direction and the other for governing the passage of a train over said track switch in the opposite direction, two track circuited approach zones one extending in one direction and governing one of said home signals and the other extending in the other direction from said track switch and governing the other of said home signals, a switch machine for operating said track switch, a control relay controlled from a distant point for controlling the operation of said switch machine unless prevented, and other means located at the switch for preventing operation of said switch machine in response to said control relay unless the home signal for a particular approach zone is at stop and was at stop at the time an approaching train occupying said particular zone entered the same.

45. In a train dispatching system, the combination with a single track section of track diverging at each end into two diverging tracks through the medium of a track switch, of signals for governing the movement of trains off of said diverging tracks, a control relay at each end of said single track section for controlling the signals at the corresponding end, a dispatcher's office containing a lever for each end of said single track section for controlling the control relay at the corresponding end of said single track section to clear a signal in accordance with the position of the track switch at that end, and interlocking means for preventing the clearing of a signal at one end of said single track section if a signal at the other end of said section indicates proceed even though the corresponding control relay is in a position to clear such signal.

46. In a train dispatching system, the combination with a single track section of track diverging at each end into two diverging tracks through the medium of a track switch, of a switch machine for each of said track switches, a control relay near each of said track switches, signals for governing the movement of trains off of said diverging tracks, a dispatcher's office containing a lever for each end of said single track section each for energizing the control relay for the corresponding track switch to clear the signals associated therewith in accordance with the position of said switch machine, and interlocking means for preventing the clearing of a signal at one end of said single track section even though the control relay for said signal is in a condition to clear such signal when a signal at the other end of said section indicates proceed.

47. In a train dispatching system, the combination with a single track section of track diverging at each end into two diverging tracks through the medium of track switches, of starting signals for governing the movement of trains off of said diverging tracks, entering signals for governing the movement of trains off of said single track section into said diverging tracks, a control relay near each end of said single track section, a dispatcher's office containing a lever for each of said control relays for energizing said control relays and in turn clearing the starting signals and entering signals at the corresponding end of said single track section in accordance with the position of the corresponding track switch, and interlocking means for preventing the clearing of a starting signal at one end of said single track section but permitting the clearing of the entering signal at that end of the single track section corresponding to the position of the associated track switch in response to energization of the corresponding control relay when a signal at the other end of said section indicates proceed.

48. In a train dispatching system, the combination with a single track section of track diverging at each end into two diverging tracks through the medium of track switches, of a switch machine for each of said track switches, starting signals for governing the movement of trains off of said diverging tracks into said single track section, entering signals for governing the movement of trains out of said single track section into said diverging tracks, a control relay near each end of said single track section, a dispatcher's office containing a lever for each of said control relays for energizing said control relays and in turn controlling the switch machine and the signals for the corresponding end of said single track section, the starting or entering signal only corresponding to the position of the switch machine clearing in response to the energized position of the corresponding control relay, and interlocking means for preventing the clearing of a starting signal at one end but permitting the clearing of the entering signal at that end in response to energization of the control relay at that end when a starting signal at the other end of said section indicates proceed.

49. A train dispatching system comprising, a main track and a siding diverging therefrom, a track switch for controlling movement of traffic over the main track and into said siding, signals for governing movement of traffic over said main track and into said siding, a switch machine for governing operation of said track switch, a detector track circuit associated with said track switch, a distant dispatcher's office, an audible indicator in said dispatcher's office, a lever in said dispatcher's office, and means for controlling said indicator in accordance with the occupancy of said detector track circuit and controlling said switch machine and signals in accordance with the operated position of said lever over the same line circuit.

50. In combination, a railway track switch, a signal for directing traffic movements over said switch, an approach track circuit for said signal including a track relay, a stick relay controlled by said signal and by said track relay, a time element device controlled by said stick relay, and means controlled by said time element device for controlling said switch.

51. In combination with a main section and an approach section of railway track, a switch in said main section, a signal for governing traffic over said switch, mechanism for operating said switch, locking means for preventing operation of said mechanism if said approach section is occupied while said signal indicates proceed, a time element device which may be set into operation if the signal is restored to the stop condition even though said approach section is occupied, and means controlled by said time element device for permitting operation of said switch operating mechanism independently of the condition of said locking means.

52. In combination, a railway track switch, a signal for directing traffic over said track switch, a track circuit including a track relay, a stick relay, a pick-up circuit for said stick relay including a signal contact of said signal closed when said signal is at stop and a front contact of said track relay, a stick circuit for said stick relay including said signal contact and a stick contact of said stick relay, a time element device controlled by said stick relay, and means controlled by said time element device for controlling said switch.

53. In a railway train control system in combination, a trackway divided into blocks, a siding switch diverging from the main trackway, a motor for operating said switch to the open or closed position, signals to indicate the condition of the trackway, a relay adjacent the trackway for controlling the motor and the signals, a central office, one electrical circuit between said central office and said relay, and manually operated means at the central office for conditioning said circuit to effect the operation of said switch motor and said signals, track circuits for the block in advance and for the approach block in the rear of said switch, and means controlled by said track circuits for rendering the manual conditioning of the signals or the switch operating motor ineffective if a train is in the advance or approach block respectively.

54. In combination, a railway traffic governing device, a polarized relay for controlling said device, a contact controlled by said device, an indication relay; and a manually operable lever for supplying current of one polarity or the other to the polarized relay, the indication relay and said contact in series.

55. In combination, a railway traffic governing device, a polarized relay for controlling said device, a normally closed contact controlled by said device and arranged to be opened for a brief interval during operation of said device, an indication relay, and means for supplying current of one polarity or the other to said two relays in series with said contact.

56. In combination, a railway traffic governing device, a first relay for controlling said device, an indication relay, a circuit including said first relay and said indication relay in series, and means controlled by said device for at times operating upon said circuit to affect said indication relay but not said first relay.

57. In combination, a first relay located at one point, a manually operable lever located at another point, an indication relay adjacent such other point, a circuit controlled by said lever and including said first relay and said indication relay, and means controlled by said first relay for at times operating on said circuit to affect said indication relay but not said first relay.

58. In combination with a power operated track switch, a first relay, a motor controlled by said first relay for operating said switch, an indication relay, a manually operable lever, a circuit controlled by said lever and including said first relay and said indication relay in series, and means controlled by said switch for at times opening said circuit to de-energize said indication relay for a brief interval without deenergizing said first relay.

59. A train control system comprising a trackway divided into blocks, a track circuit for each block, siding switches at intervals along the trackway, motors for operating the switches, a central office, means at the central office for establishing a plurality of signalling currents, means for transmitting said currents to the trackway to effect the display of signals of predetermined meaning, one of said signals indicating danger being subject to preferential track circuit control, a branch circuit for operating the switch motor controlled by said central office selection, a wayside signal for normally indicating the position of the switch, said branch circuit for the motor being subject to track circuit control in a block adjacent the siding switch, and said wayside signal indication being additionally subject to track circuit control for the block in which the siding switch is located.

60. A central control and dispatching system for railways comprising a trackway divided into blocks, a track circuit for each block, passing sidings at intervals along said trackway to permit the passage of trains, said sidings dividing the trackway into single track sections comprising a plurality of blocks, means for conditioning two sets of signals for governing the movements of a train moving in one or the other direction over said trackway, a central office, a dispatching circuit between said central office and each section, two means for each section end for controlling the signal conditioning means for each section, one controlling means including said dispatching circuit and being manually operated at said central office, the other means being automatically operated by track circuits, and means each including a track circuit of one of said blocks and the corresponding dispatching circuit for indicating at said central office the location of trains.

61. A central control and dispatching system for single track railways over which trains operate in either direction comprising a trackway divided into blocks, a track circuit for each block, passing sidings at intervals along said railway to permit the passage of trains and dividing the railway into sections, means for conditioning proceed and stop signals for both directions of train operation, a central office, means for each section manually operated at the central office for controlling the signal conditioning means for each section and an adjoining block at each end of said section by energizing line circuits extending to each section, and track circuit controlled means whereby when a train going in one direction has entered a single track section the signal conditioning means at the other end of the section for the other direction of train operation is conditioned to indicate stop.

62. A central control and dispatching system for single track railways over which trains operate in either direction comprising a trackway divided into blocks, a track circuit for each block, passing sidings at intervals along said railway to permit the passage of trains and dividing the railway into sections, means for conditioning proceed and stop signals for both directions of train operation, a central office, a dispatching circuit between said central office and each section, means for each section manually operated at the central office for controlling over said dispatching circuit the signal conditioning means for each section and an adjoining block at each end of said section, and track circuit controlled means whereby when a train going in one direction has entered a single track section the signal conditioning means at the other end of the section for the other direction of train operation is conditioned to indicate stop.

63. A central control and dispatching system for single track railways over which trains operate in either direction comprising a trackway divided into blocks, a track circuit for each block, passing sidings at intervals along said railway to permit the passage of trains and dividing the railway into sections, means for conditioning proceed and stop signals for both directions of train operation, a central office, means for each section manually operated at the central office for controlling by the sequence of energization of line circuits the signal conditioning means for each section and an adjoining block at each end of said section, and track circuit controlled means whereby when a train going in one direction has entered a single track section the signal conditioning means at the other end of the section for the other direction of train operation is conditioned to indicate stop, and means including some of said track circuits for indicating at said central office the location of a train.

64. A central control and dispatching system for single track railways over which trains operate in either direction comprising a trackway divided into blocks, a track circuit for each block, passing sidings at intervals along said railway to permit the passage of trains and dividing the railway into sections, means for conditioning proceed and stop signals for both directions of train operation, a central office, a dispatching circuit between said central office and each section, means for each section manually operated at the central office for controlling the signal conditioning means for said section and an adjoining block at each end of said section, and track circuit controlled means whereby when a train going in one direction has entered a single track section the signal conditioning means at the other end of the section for the other direction of train operation is conditioned to indicate stop, and means for each section including one of said track circuits and said dispatching circuit for indicating at said central office the location of a train.

65. Time element approach locking means for power operated switches comprising, a signal governing traffic over the switch, and an electrically operable time element device for controlling the operation of said switch, said time element device being set into operation upon change of the indication of said signal from clear to stop while a train is approaching the switch.

66. A protective system for power operated switches comprising, in combination with a track switch and a signal governing traffic over it, a stick relay acting when deenergized to prevent operation of said switch, and an electrically controlled time element device set into operation upon deenergization of said stick relay, provided said signal indicates stop.

67. In combination, a railway traffic governing device, a signal governing traffic over said device, a stick relay controlled by said signal and by traffic conditions, a time element device controlled by said relay, and means controlled by said relay and by said time element device for controlling said railway traffic governing device.

68. In combination, a railway signal, a stick relay controlled by said signal and by traffic conditions, a time element device controlled by traffic conditions, and a railway track switch controlled by said relay and by said device.

69. In combination with a railway track switch, a switch machine having an electric motor for operating said switch, a signal for governing traffic over said switch, a stick relay for controlling the motor circuit of said switch machine, a pick-up circuit for said stick relay controlled by traffic conditions and energizable only when said signal indicates stop, and a stick circuit for said stick relay energizable only when said signal indicates stop.

70. In combination, a section of railway track containing a switch, an approach section for one direction adjoining said switch section, a second approach section adjoining said switch section for the other direction, an approach locking relay, a circuit controlled by traffic conditions in said first approach section for controlling said relay, a second circuit controlled jointly by traffic conditions in said switch section and in said second approach section for controlling said relay, and means controlled by said approach locking relay for controlling said switch.

71. In combination, a section of railway track containing a switch, an approach section adjoining said switch section, a signal for governing traffic movements through said switch section into said approach section, an approach locking relay, a pick-up circuit for said relay controlled by traffic conditions in said switch section and said approach section, a stick circuit for said relay controlled by said signal, and means controlled by said approach locking relay for controlling said switch.

72. In combination, a stretch of railway track including a first and a second section as well as a track switch, approach locking means adjacent the switch for at times preventing operation of said switch when a train approaches said switch, and means controlled jointly by traffic conditions in said first section and by traffic conditions in said second section for governing said approach locking means to permit operation of said switch.

73. In combination, an indication relay controlled in accordance with railway traffic conditions, a slow-release relay controlled by said indication relay, an indication means, and means controlled by said indication relay and by said slow-release relay for controlling said indication means.

74. In combination, an indication relay controlled in accordance with railway traffic conditions, a slow-release relay controlled by said indication relay, an indication means, and a circuit controlled by said indication relay and by said slow-release relay for controlling said indication means.

75. In combination with a detector section of railway track including a track switch, a signal governing the movement of traffic through said section, a track relay for said section, selecting means controlled from a distant point for operating the switch, a stick relay, means for preventing operation of said switch by said selecting means except when said stick relay is energized, and means controlled by said track relay and responsive to the movement of a train through said section under the control of said signal, for picking up said stick relay.

76. In combination, a railway track switch, a polarized switch relay for controlling said switch, a track circuit for said switch including a track relay, a normal and a reverse pick-up circuit for energizing said switch relay, and a stick circuit for said switch relay including one of its own polar contacts and a back contact controlled by said track relay for retaining said switch relay in an energized condition as long as said back contact remains closed.

77. A relay interlocking system comprising a control relay, a second control relay, a manually operable device, a second manually operable device which is mechanically independent of said first device, a circuit controlled by said first device and by said second relay for controlling said first relay, and a circuit controlled by said second device and by said first relay for controlling said second relay.

78. In combination, a railway switch, controlling apparatus governed from a remote point for causing operations of said switch, a signal governing traffic over said switch and also governed from said remote point, an approach section located in the rear of said signal, approach locking means controlled by traffic in said approach section and in accordance with the indication given by said signal for preventing operation of said switch, and means for at times releasing the locking effected by said approach locking means a predetermined time after said signal is put to stop, said means including a slow acting device, and said means being effective only when said controlling apparatus is governed to tend to cause operation of said switch.

79. In combination; a stretch of railway track including a detector track section; a track circuit for said track section including a track relay; a track switch leading from said detector track section; a signal governing the movement of traffic over said track switch; a stick lock relay which if deenergized prevents operation of said track switch, but which if energized permits operation of said track switch; a second relay energized in response to deenergization of said track relay by a train passing over said switch; a contact closed only if said signal is at stop; a pick-up circuit for said lock relay closed only if said contact is closed, said track relay is energized and said second relay is energized; and a stick circuit for said lock relay closed only if said contact is closed.

80. In combination, a track layout including a track switch for setting up a plurality of routes, power operated means for operating said track switch, a signal for each route for governing the entrance of traffic into such route, and unitary means for determining the route by concurrently controlling the power operated means and tending to clear the signal over the route determined by said power operated means, either of said signals responding only if said power operated means has been operated into correspondence with said unitary means.

81. In combination, a track layout including a track switch for setting up a plurality of routes, power operated means for operating said track switch, a signal for each route for governing the entrance of traffic into such route, an approach section, a lock relay for when deenergized preventing the operation of said power operated means and deenergized if said approach section is occupied while either of said signals is at proceed, and unitary means for determining the route by controlling the power operated means and for clearing the signal over the route determined by said power operated means, either of said signals responding only if said power operated means has been operated into correspondence with said unitary means.

82. In combination, a track layout including a track switch for setting up a plurality of routes, power operated means for operating said track switch, a signal for each route for governing the entrance of traffic into such route, an approach section, a lock stick relay at the switch for when deenergized preventing the operation of said power operated means and deenergized if said approach section is occupied while either of said signals is at proceed, unitary means for determining the route by controlling the power operated means and for clearing the signal over the route determined by said power operated means, either of said signals responding only if said power operated means has been operated into correspondence with said unitary means, and means responsive to a train in said approach section departing from said track switch for permitting energization of said lock stick relay.

83. In a signalling system for a stretch of single track diverging into a main track and siding, signals located at intervals in said stretch for governing traffic in both directions, means for causing all signals in the rear of a signal for a certain direction of traffic to indicate danger if such signal indicates danger, means controlled by each signal while moving to danger as a train passes it for rendering said means ineffective, starting signals for governing traffic from the main track and from the siding into said stretch, manually operable means for holding the first signal of signals governing each direction of traffic at danger, means effective if the first signal for its direction of traffic is permitted to assume its clear position as a result of manipulation of said manually operable means to cause the signals governing traffic in the other direction to indicate danger, and means including said manually operable means for holding either one or both of said starting signals at said siding at stop.

84. In a signalling system for a stretch of single track having a track switch at one end, signals at intervals for governing traffic through said stretch in both directions and including starting signals at the switch for governing traffic into said stretch over said switch in its different positions, means including manually operable means at a distant control point for controlling said signals to hold them at stop or allow them to clear for either direction of traffic, means effective only if the signals for one direction of traffic are permitted to assume the clear condition as a result of the manipulation of said manually operable means to prevent clearing of the signals for the other direction of traffic, said manually operable means including relay means located at said track switch, a power-operated switch machine controlled by said relay means for operating said track switch, means for preventing operation of said switch machine in response to a change in the condition of said relay means unless the signals governing traffic over said switch are at stop, and means including the same line wires for informing the operator at the control point when a train passes over said track switch.

85. In a centralized traffic control system, the combination with a railway track having a portion thereof divided from the rest of said track by insulated joints, a track circuit for said portion including the usually normally energized track relay and a source of current, a dispatcher's office, a line circuit connecting said office and said track portion including indicating means located at said office, a wayside signal located at said track portion and governed by said line circuit subject to traffic conditions on said track portion and in advance thereof, and means located at said track portion and responsive to the condition of said track relay and also to the indicating condition of said wayside signal for distinctively changing the condition of energization of said line circuit to cause distinctive operation of said indicating means to inform the operator of the movement of trains into and out of said track portion and a change in the indication displayed by said signal.

86. A system for controlling from a central control point the operation of a distant power-operated switch and associated signals governing traffic over said switch in one direction from an approach section comprising, control means at the switch governed over line wires from said central control point and adapted to be conditioned to cause simultaneous control of the operation of said power operated switch and clearing of one or the other of said signals in accordance with such operated position of the switch, and approach locking means located at the switch and rendered effective by the presence of a train on said approach section only if such train entered said approach section at a time when either of said signals indicated proceed, said approach locking means when effective preventing operation of said switch irrespective of the condition of said control means and even though both of said signals may then indicate stop.

87. In a centralized traffic control system for railroads, the combination with a power operated track switch and home and distant signals governing traffic over said switch in one direction, means in a control office manually operable for the purpose of governing the operation of said switch and the clearing of said signals, control means located at the switch and governed over line wires by said manually operable means, said control means being adapted to be conditioned at any time to cause operation of said switch and clearing of said signals, and approach locking means located at the switch for preventing operation of said switch irrespective of the condition of said control means while a train is approaching said switch only provided said train approached within a limited distance of the switch at the time said signals indicated proceed.

88. A system for the operation of a track switch and its associated signals from a distant control office comprising, in combination with a switch machine for moving and locking the points of the switch, signals for governing traffic over said switch in its different positions in one direction, and an approach track section having track circuits, of relay means at the switch conditioned over line wires from the control office for simultaneously tending to cause operation of said switch machine and clearing of the particular signal for such operated position of the switch, approach locking means located at the switch and including a stick relay for preventing operation of said switch machine regardless of the condition of said relay means, a pick-up circuit for said stick relay closed only if said signals all indicate stop and said approach track section is also not occupied, and a stick circuit for said stick relay including its own front contact and closed if said signals all indicate stop and even though said approach section is occupied.

89. A system for governing the operation of a track switch and the indications of its associated signals from a distant control office comprising, an electrically operated switch machine for moving and locking the points of the track switch, signals for governing traffic in one direction over said switch in its normal and reverse position respectively, local clearing circuits for said signals controlled by contacts respectively closed only if said switch machine is locked in its normal or reverse position, an approach section of track equipped with track circuits, electrically operable control means at the switch conditioned over line wires from the distant control office for simultaneously tending to cause operation of said switch machines and closure of said clearing circuits for said signals, and electrically operable approach locking means at the switch acting unless energized to interrupt the supply of operating current to said switch machine irrespective of the condition of said control means, and governing circuits for energizing said approach locking means only if said signals are all at stop and said approach section is either not occupied or the train therein entered at a time when said signals were at stop.

90. In a system of the character described, the combination with a power operated switch machine and locking means preventing the operation thereof under traffic conditions adverse to such operation, of an electrically operable time element device located adjacent the switch machine and effective after a predetermined time of operation to permit operation of said switch machine notwithstanding the existence of the adverse traffic conditions rendering said locking means effective, and means controlled over line wires from a distant control point for initiating operation of said time element device.

91. A centralized traffic control system for railroads comprising, a power operated switch machine for operating a track switch, signals governing traffic over said switch in its different positions, line wires extending from a central office to said switch, control means at the switch governed over said line wires for controlling the operation of said switch machine and also the clearing of the particular signal for the corresponding operated position of said switch, locking means for preventing operation of said switch machine irrespective of the condition of said control means under traffic conditions adverse to such operation, and means in the central office operated over the same line wires for indicating the response of said switch machine to a change in the condition of said control means.

92. A system for controlling traffic on railroads from a central control office comprising, a power operated track switch, signals governing traffic in one direction over said switch in both its normal and reverse positions, a signal governing traffic in the opposite direction toward said switch, track circuits for detecting the presence of a train at any point between said signals governing traffic in opposite directions, normally energized line circuits controlled by said track circuits and in accordance with the indications of said opposing signals to prevent clearing at the same time of signals governing traffic in opposite directions, electrically operable control means adjacent the switch for governing both the operation of said switch and the clearing of said signals, manually operable control devices at the distant control office adapted to be positioned to determine the operated position of said switch and the clearing of the signals for one direction of traffic or the other, and means including line wires extending from the control office to the switch location for governing said control means in accordance with the positioning of said manually operable control devices.

93. In a centralized traffic control system of the character described, a stretch of track provided with track circuits, signals at opposite ends of said stretch for governing train movement into said stretch, a line circuit for each signal controlled by said track circuits, means at each signal effective when that signal indicates proceed for causing interruption of the line circuit for the other opposing signal, relay means at each signal for governing the clearing thereof subject to the control of its line circuit, manually operable control means in a distant control office, and means including line wires extending from the control office to the signal locations for conditioning said relay means in accordance with the existing condition of said manually operable control means.

94. In a system of central control for governing traffic over a stretch of track equipped with track circuits and having a track switch, signals governing traffic over said switch in both its positions and in both directions, clearing circuits for said signals, contacts associated with said switch and closed only if said switch is in its normal or reverse position respectively for governing the clearing circuits for the signals corresponding to such normal or reverse position of the switch, means for controlling said clearing circuit for each signal by said track circuits in advance thereof, control means at the switch operable to one condition to establish the clearing circuits for both of the signals for one position of said switch, said control means being operable to another condition to establish the clearing circuits for both of the signals for the other position of said switch, and means for conditioning said control means from a distant control office.

95. In a remote control system for a power operated track switch and its associated signals governing traffic over said switch in its different positions, a neutral polar relay at the switch controlled over line wires from a distant control office for governing operation of said switch, contacts responsive to the operation of said switch and respectively closed only if it is in its normal or reverse position, clearing circuits for said signals including said normal and reverse contacts respectively, and means for closing said clearing circuits only while said relay is energized.

96. In a system of remote control for a power operated track switch and its associated signals comprising, relay means adjacent the switch controlled over line wires from a distant control office to assume distinctive energized conditions to govern accordingly the operation of said switch, contacts operated in accordance with the position of said switch, clearing circuits for said signals controlled by said contacts and closed only if said relay means is energized, and means for transmitting indications from the switch location to the control office over the same line wires without disturbing the energized condition of said relay means.

97. In a system of remote control for a power operated track switch and its associated signals governing traffic over said switch in its normal and reverse positions comprising, a control relay adjacent the switch acting if energized to govern operation of said switch and to tend to clear the corresponding signal, manually operable means at a distant control office for governing the energization of said relay over line wires extending from said control office to the switch location, indicating means in the control office responsive to the continuity of said line wires, and means at the switch location for interrupting the continuity of said line wires without de-energization of said relay for the purpose of transmitting indications to the control office.

98. A system for controlling from a central control office the operation of a distant power operated switch and associated signals governing traffic in both directions over said switch in its different operated positions comprising, control means at said switch adapted to be conditioned to cause concurrent power operation of said switch and control to clear a signal dependent upon the position of said switch, manually operable control means in the control office adapted to be positioned to determine the desired position of said switch and the clearing of a corresponding signal, means including line circuits extending from the control office to the switch location for conditioning said control means in accordance with the existing positioning of said manually operable means, and means including the same line wires for transmitting code signals to the control office indicating the operation of said switch and signals.

99. A system for governing train movement over a stretch of railway track equipped with track circuits and having opposing signals at the opposite ends of said stretch for governing train movement in opposite directions and comprising, a home relay for each signal, a normally energized line circuit for energizing each home relay and including front contacts of the track relays of said track circuits, means effective when either one of said signals indicates proceed to interrupt said line circuit for the other opposing signal, control means for each signal for governing the clearing thereof subject to the control of its home relay, means including line wires for controlling at will the energization of said control means from a distant control office, and means operating over said same line wires for indicating in the control office the presence of a train on a track circuit adjacent each signal.

100. In a system for governing traffic on railroads from a control office comprising, a track circuit, a power operated track switch in said track circuit, signals for governing traffic over said switch in its different positions and each having a clearing circuit governed by said track circuit and closed only if said switch is in the corresponding normal or reverse position, line wires extending from the control office to the switch location, manually operable means in the control office adapted to be positioned to direct train movement over said switch in its different positions and acting to apply to said line wires currents of distinctive character in accordance with such positioning, control means at the switch responsive to the character of current applied to said line wires at the control office for concurrently governing operation of said switch and closing a break in the clearing circuit for the particular signal corresponding to such operated position, and means including the same line wires for transmitting indications to the control office of the condition of said track circuit.

101. A centralized traffic control system comprising, a power operated track switch and associated signals, track circuits governing said signals, line wires extending to said switch location from a distant control office, means at the switch responsive to the character of energization of said line wires for controlling operation of said switch and concurrently therewith also governing the indication of said signals subject to their control by said track circuit and the operated position of said track switch, manually operable means in the control office for determining the character of energization of said line wires, and means for transmitting over said same line wires from the switch location to the control office indications of the operation of said switch and signals.

102. A system of signalling of the character described comprising, a power operated track switch and associated signals governing traffic over said switch in its different positions, a distant control office, line wires extending from said control office to the switch location, electro-responsive control means adjacent the switch and responsive to the character of energization of said line wires for concurrently governing the operation of said switch and the clearing of said signals, indicating means in the control office responsive to the opening of said line wires, a track section at the switch, and means responsive to a train on said track section for governing the continuity of said line wires to operate said indicating means.

103. A centralized traffic control system for governing power operated track switches and the clearing of associated signals comprising, line wires extending from a control office to a switch location, manually operable means at the control office for causing energization of said line wires with currents of distinctive characters, means at the switch location distinctively responsive to the character of such currents for controlling the operation of said switch and also concurrently therewith governing the indication of its associated signals, a track circuit, and means controlled by said track circuit for momentarily governing the continuity of said line wires for transmitting over said same line wires code indications showing occupancy of said track circuit.

104. A centralized traffic control system for governing the clearing of signals from a distant control office comprising, line wires extending from the control office to the signal location, means at the signal location responsive to the character of current energizing said line wires for selectively clearing said signals, manually operable means at the control office for causing energization of said line wires with currents of distinctive characters, indicating means in the control office, and means at the signal location responsive to a change in the indications of said signals for intermittently interrupting the continuity of said line wires at varying time intervals to cause distinctive operations of said indicating means.

105. In a remote control system, two stations connected by a single line circuit, a source of current for said line circuit at one station, means for repeatedly interrupting the line circuit to form a code, means at said one station for reversing the polarity of said source, means at said one station controlled by code interruptions in said line circuit, and means at the other station selectively responsive to the polarity of the current in the line circuit.

106. In combination, a railway track switch, a signal for governing traffic movements from a given direction over said switch, a second signal for governing traffic movements from said given direction toward said first signal, a control instrument for controlling said second signal, and means controlled by said instrument for preventing an operation of said switch for a measured period of time when said first signal indicates "stop" after having displayed a proceed indication.

SEDGWICK N. WIGHT.